US012614373B2

(12) United States Patent
Aoyama et al.

(10) Patent No.: US 12,614,373 B2
(45) Date of Patent: Apr. 28, 2026

(54) IMAGE PROCESSING APPARATUS AND METHOD, AND IMAGE CAPTURING APPARATUS

(71) Applicant: CANON KABUSHIKI KAISHA, Tokyo (JP)

(72) Inventors: Satoshi Aoyama, Kanagawa (JP); Noboru Omori, Kanagawa (JP); Yuki Tsuihiji, Kanagawa (JP); Yuta Usui, Tokyo (JP); Yohei Fujitani, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 18/354,805

(22) Filed: Jul. 19, 2023

(65) Prior Publication Data

US 2023/0360368 A1    Nov. 9, 2023

Related U.S. Application Data

(63) Continuation of application No. PCT/JP2021/042884, filed on Nov. 24, 2021.

(30) Foreign Application Priority Data

Jan. 22, 2021    (JP) ................................. 2021-008938

(51) Int. Cl.
*G06V 10/764* (2022.01)
*G06T 3/40* (2006.01)
(Continued)

(52) U.S. Cl.
CPC .............. *G06V 10/764* (2022.01); *G06T 3/40* (2013.01); *G06V 10/774* (2022.01); *G06V 10/98* (2022.01)

(58) Field of Classification Search
CPC .... G06F 16/583; G06F 16/51; G06F 16/5866; G06F 16/9566; G06F 16/9554;
(Continued)

(56) References Cited

U.S. PATENT DOCUMENTS

2020/0366568 A1* 11/2020 George ............... H04L 41/5019
2022/0405622 A1* 12/2022 Nonaka .................... G06N 5/04

FOREIGN PATENT DOCUMENTS

JP        2009-065291 A      3/2009
JP        2009-225229 A     10/2009
(Continued)

OTHER PUBLICATIONS

The foreign references 1, 2 and 4 were cited in the International Search Report dated Feb. 8, 2022 of International Application No. PCT/JP2021/042884, which is enclosed.

*Primary Examiner* — Alex Kok S Liew
(74) *Attorney, Agent, or Firm* — Cowan, Liebowitz & Latman, P.C.

(57) ABSTRACT

An image processing apparatus comprises: a detection unit that detects a subject from an image; an inference unit that performs inference processing using an inference model on the detected subject; and a generation unit that generates an image file by combining image data of the image, information of the subject, an inference result of the inference processing, and information of the inference model. The generation unit records the inference model in a private area of the image file.

16 Claims, 20 Drawing Sheets

(51) Int. Cl.
     *G06V 10/774*       (2022.01)
     *G06V 10/98*        (2022.01)
(58) Field of Classification Search
     CPC ...... G06F 16/58; G06F 18/22; G06F 16/5846;
                G06F 16/5838; G06F 3/0482; G06F
          16/5854; G06F 18/23; G06F 18/24; G06F
         8/63; G06F 18/214; G06F 21/6209; G06F
           16/587; G06F 21/554; G06F 21/6218;
             G06F 16/14; G06F 2201/84; G06V
         10/462; G06V 10/40; G06V 20/70; G06V
          10/82; G06V 40/107; G06V 40/172;
            G06V 20/20; G06V 30/413; G06V
         40/161; G06V 2201/10; G06V 10/774;
         H04L 67/02; H04L 67/535; H04L 9/3236;
         H04L 41/16; H04L 63/1491; H04L 67/06;
             H04L 61/4511; H04L 9/3213
     See application file for complete search history.

(56)               References Cited

FOREIGN PATENT DOCUMENTS

| JP | 2015-099559 A | 5/2015 |
|----|---------------|--------|
| JP | 2021-005846 A | 1/2021 |

* cited by examiner

F I G.  2
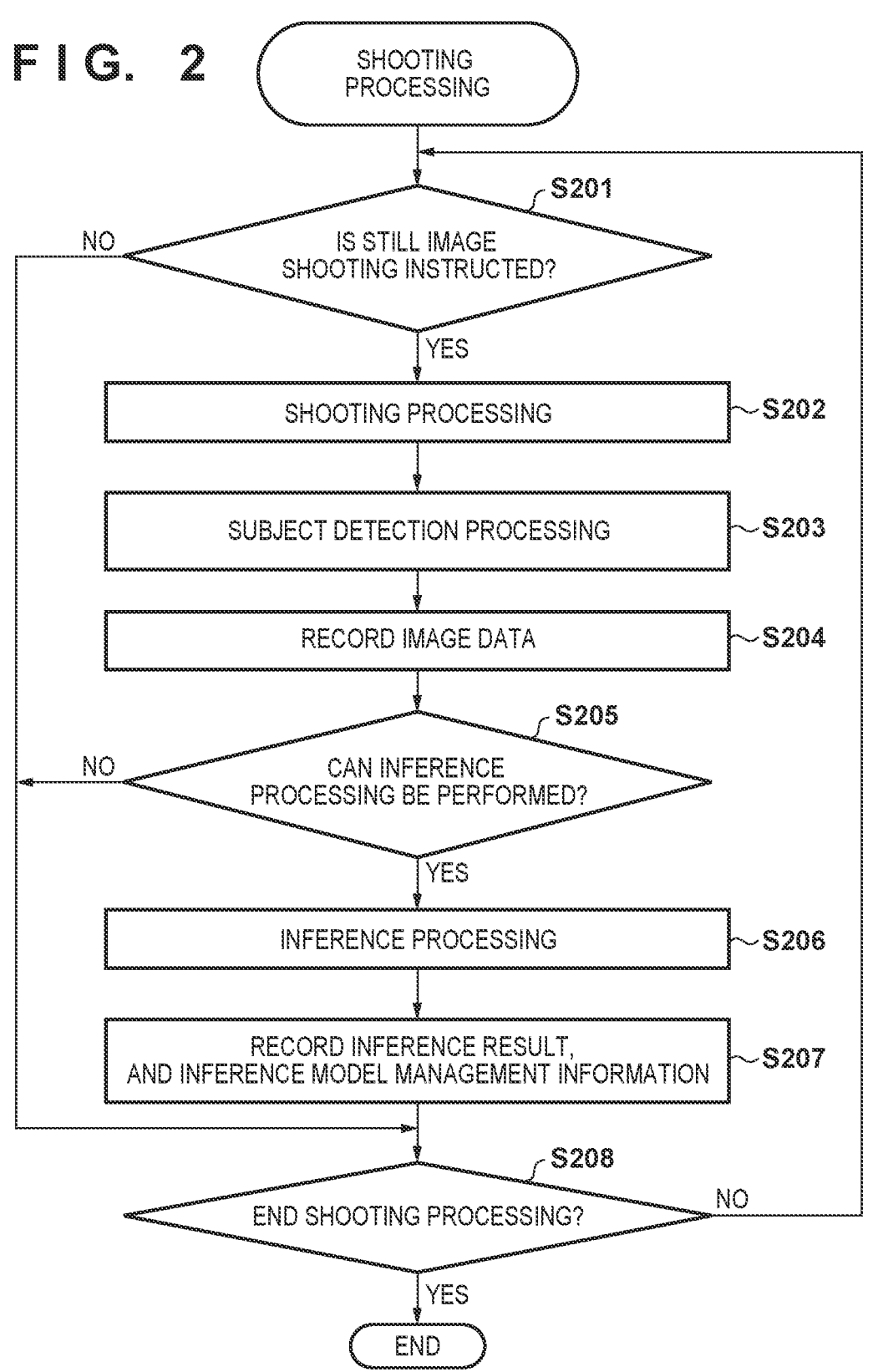

F I G. 3A
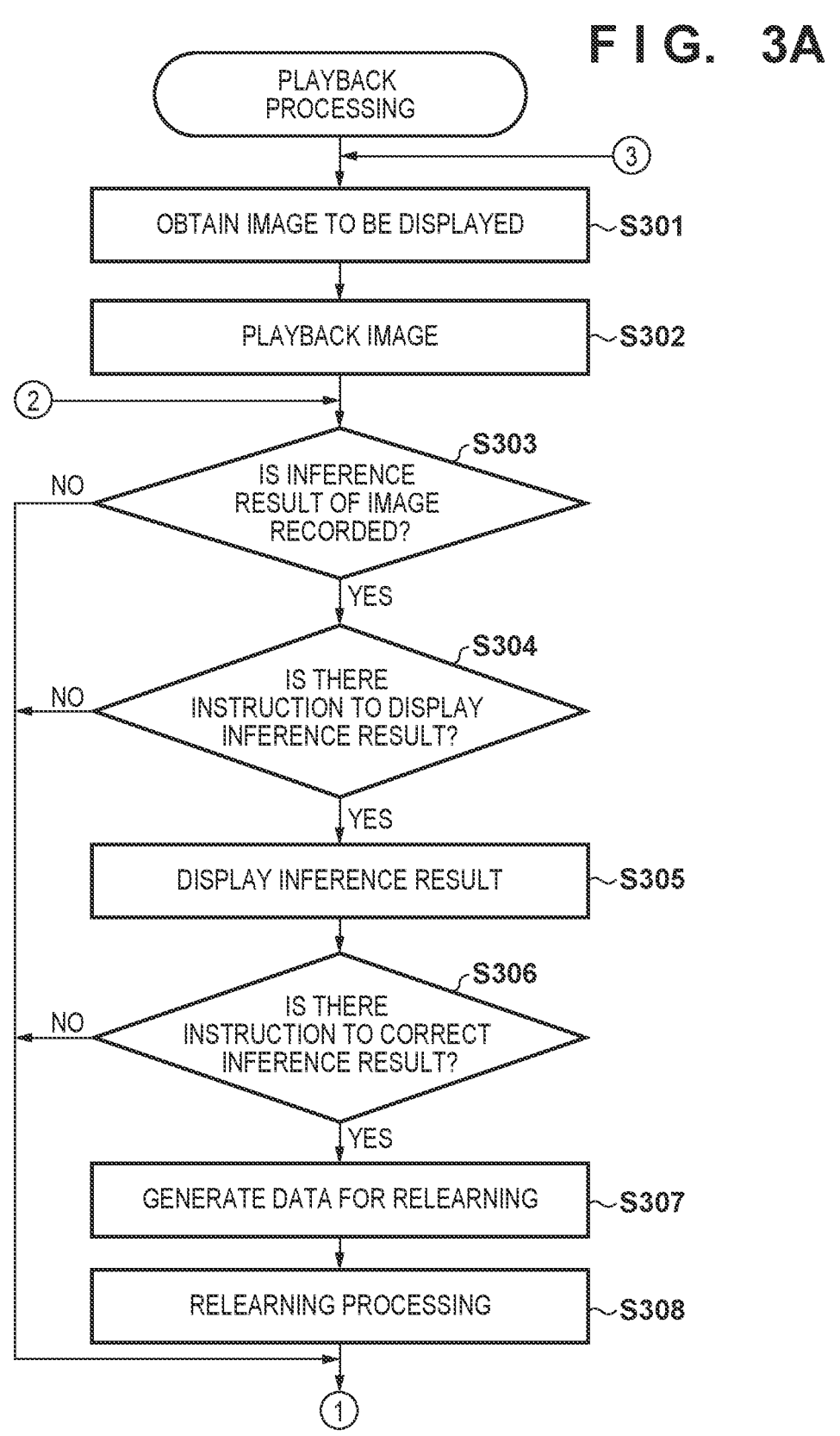

F I G. 3B
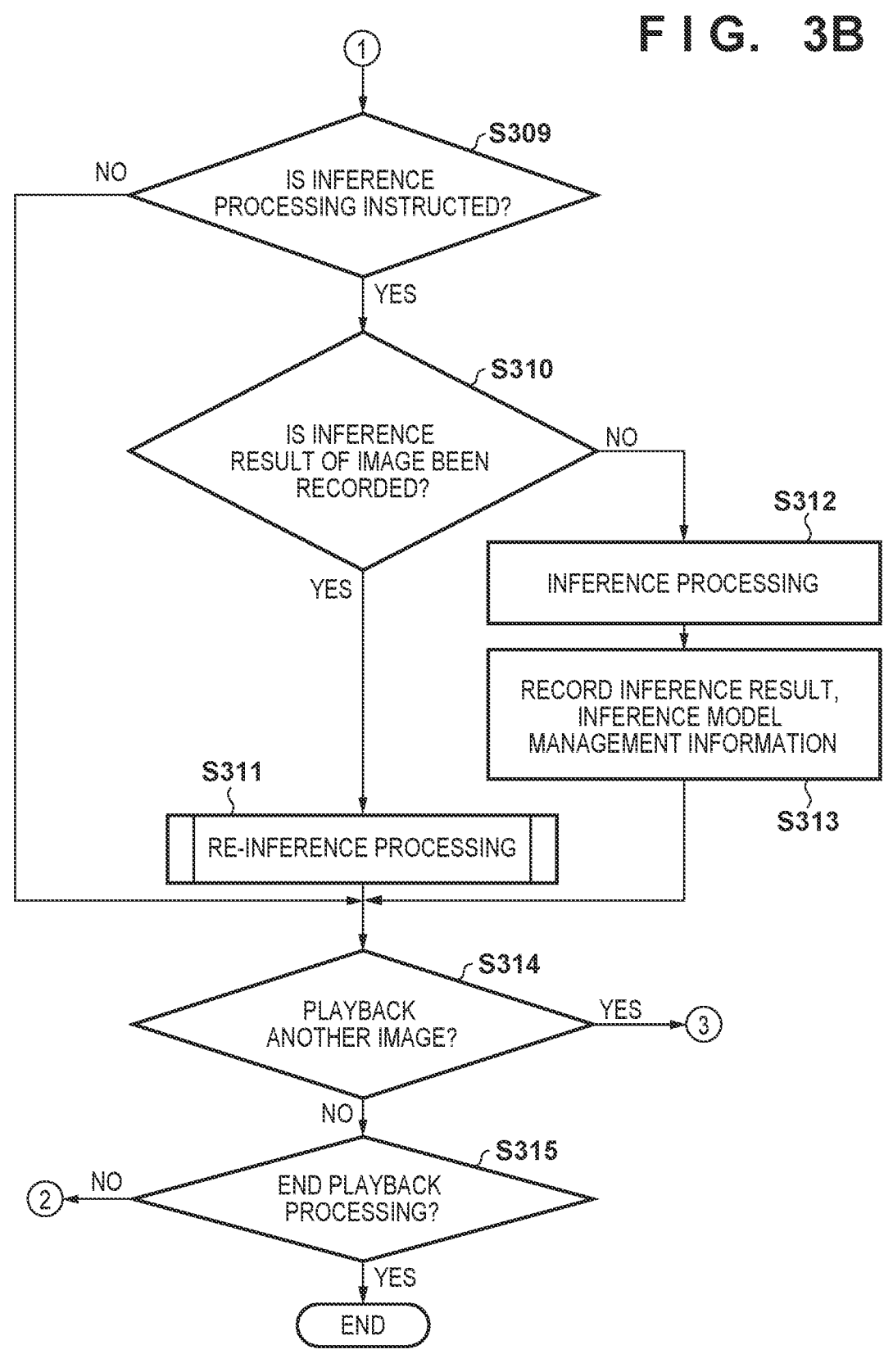

F I G. 5C

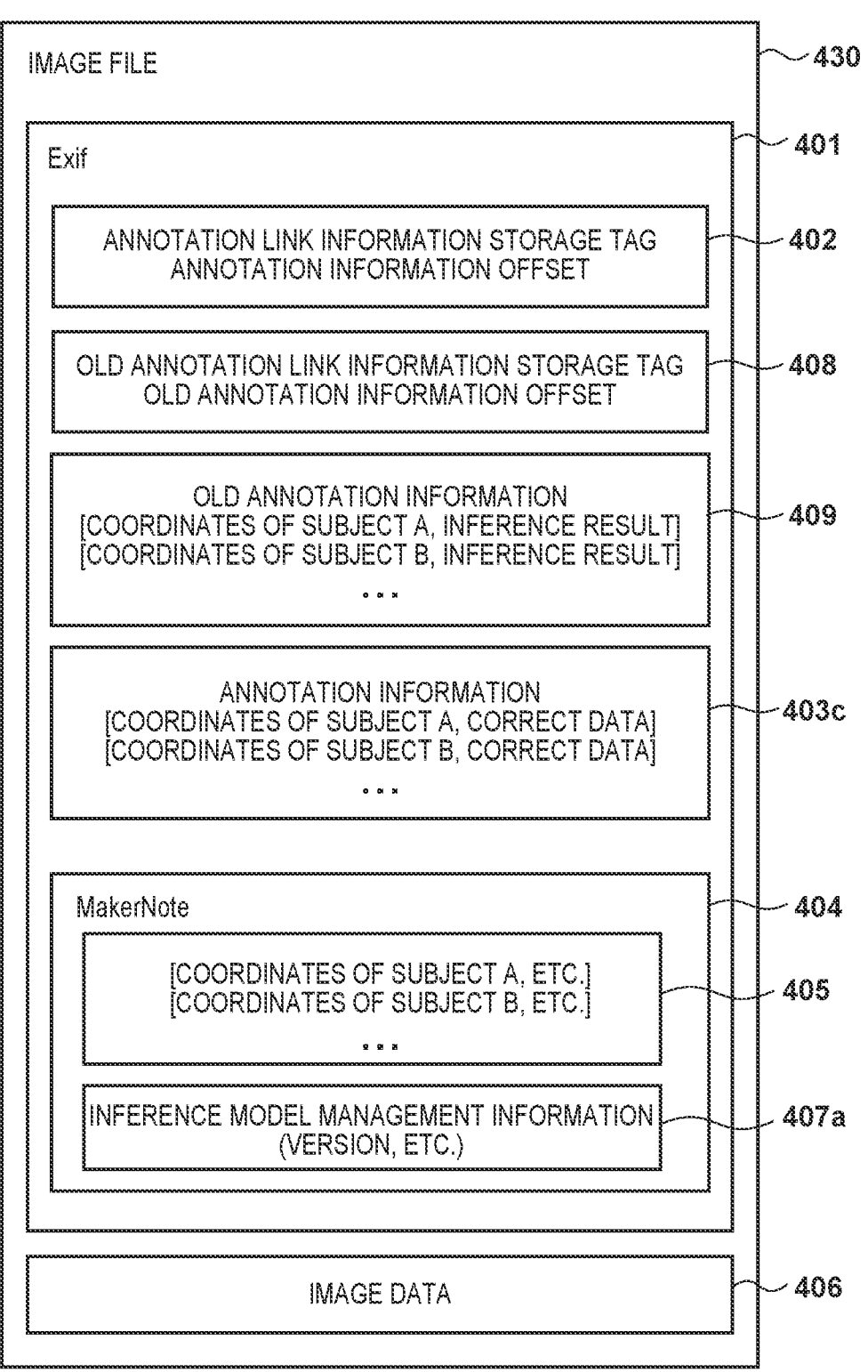

IMAGE FILE — 430

Exif — 401

ANNOTATION LINK INFORMATION STORAGE TAG
ANNOTATION INFORMATION OFFSET — 402

OLD ANNOTATION LINK INFORMATION STORAGE TAG
OLD ANNOTATION INFORMATION OFFSET — 408

OLD ANNOTATION INFORMATION
[COORDINATES OF SUBJECT A, INFERENCE RESULT]
[COORDINATES OF SUBJECT B, INFERENCE RESULT]
. . . — 409

ANNOTATION INFORMATION
[COORDINATES OF SUBJECT A, CORRECT DATA]
[COORDINATES OF SUBJECT B, CORRECT DATA]
. . . — 403c

MakerNote — 404

[COORDINATES OF SUBJECT A, ETC.]
[COORDINATES OF SUBJECT B, ETC.]
. . . — 405

INFERENCE MODEL MANAGEMENT INFORMATION
(VERSION, ETC.) — 407a

IMAGE DATA — 406

F I G. 5D
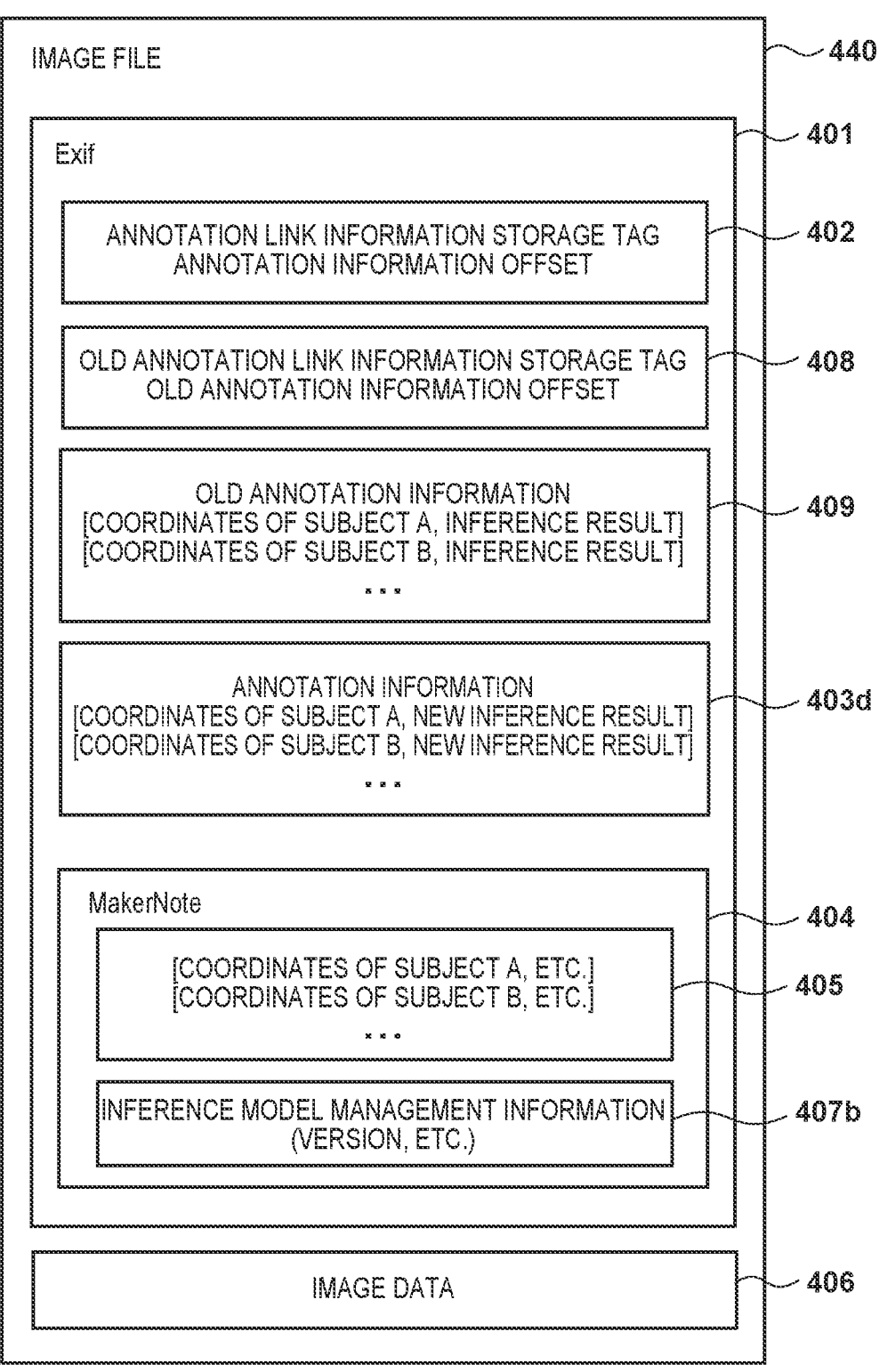

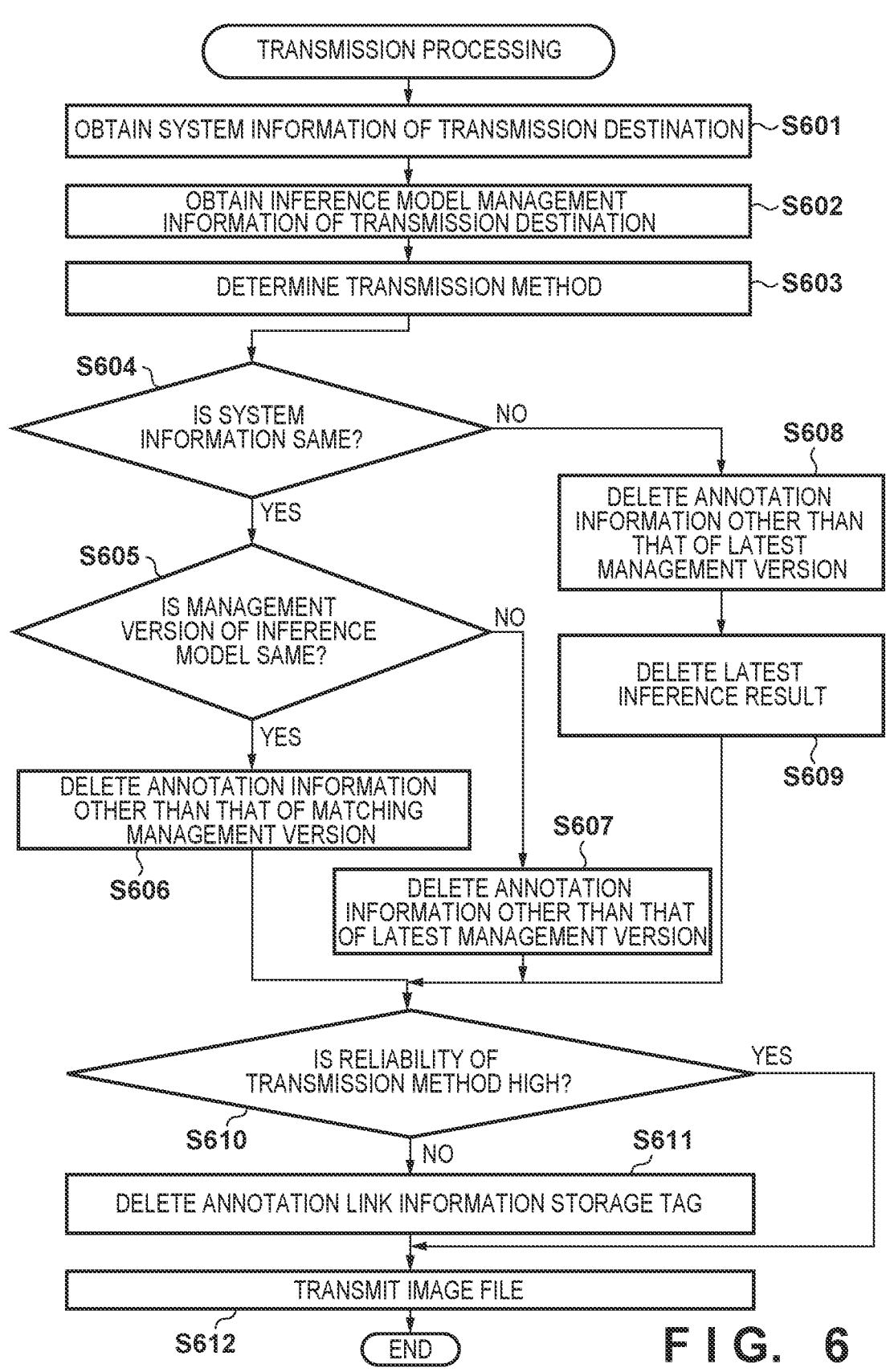
F I G. 6

F I G. 7E
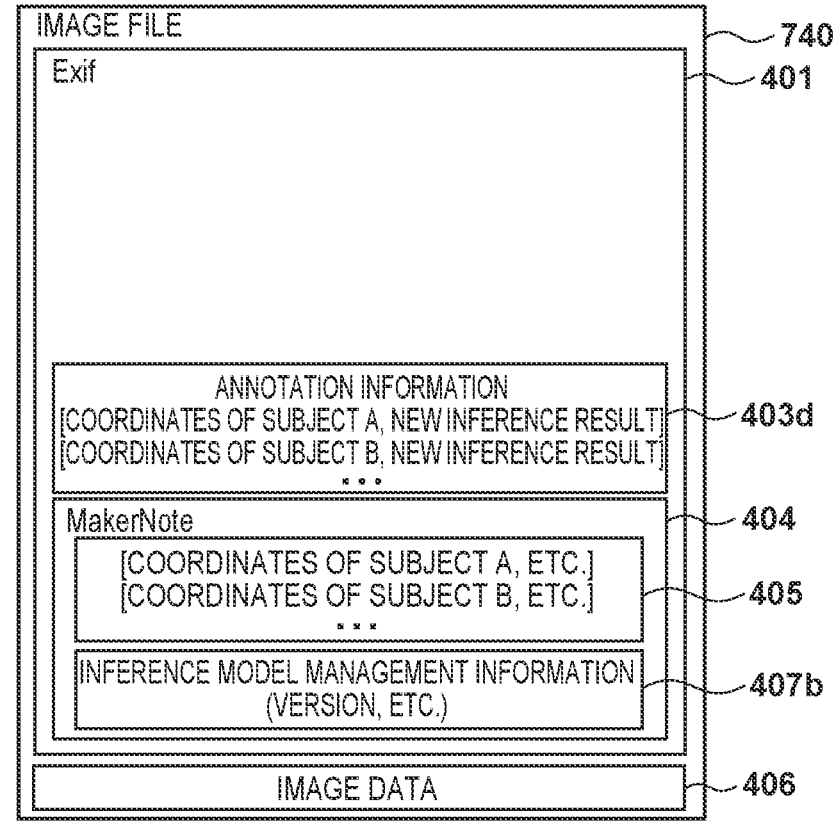
F I G. 7F
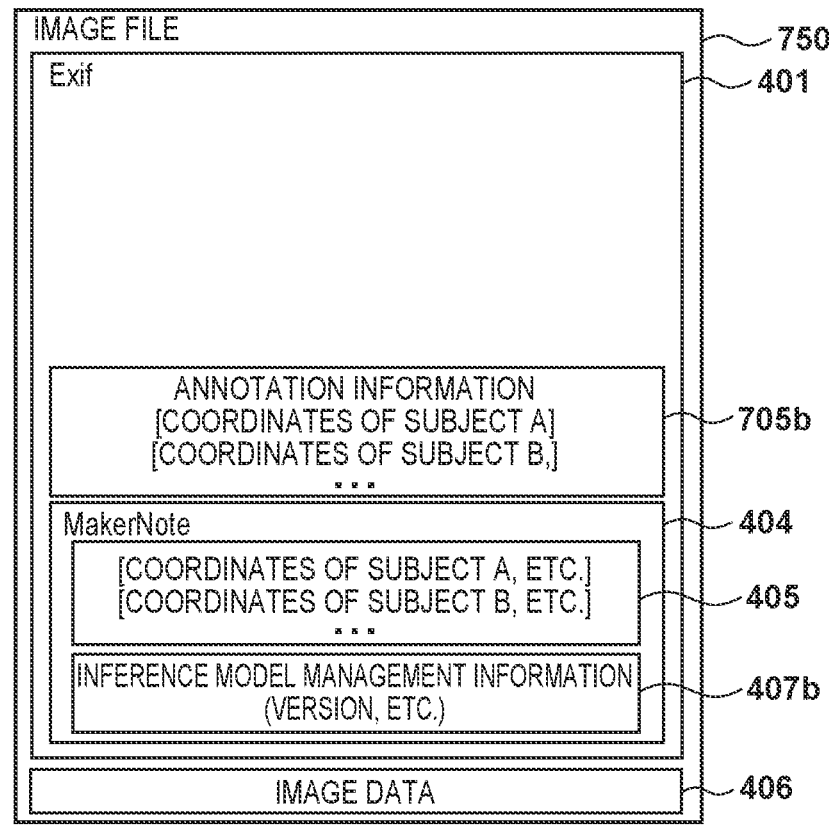

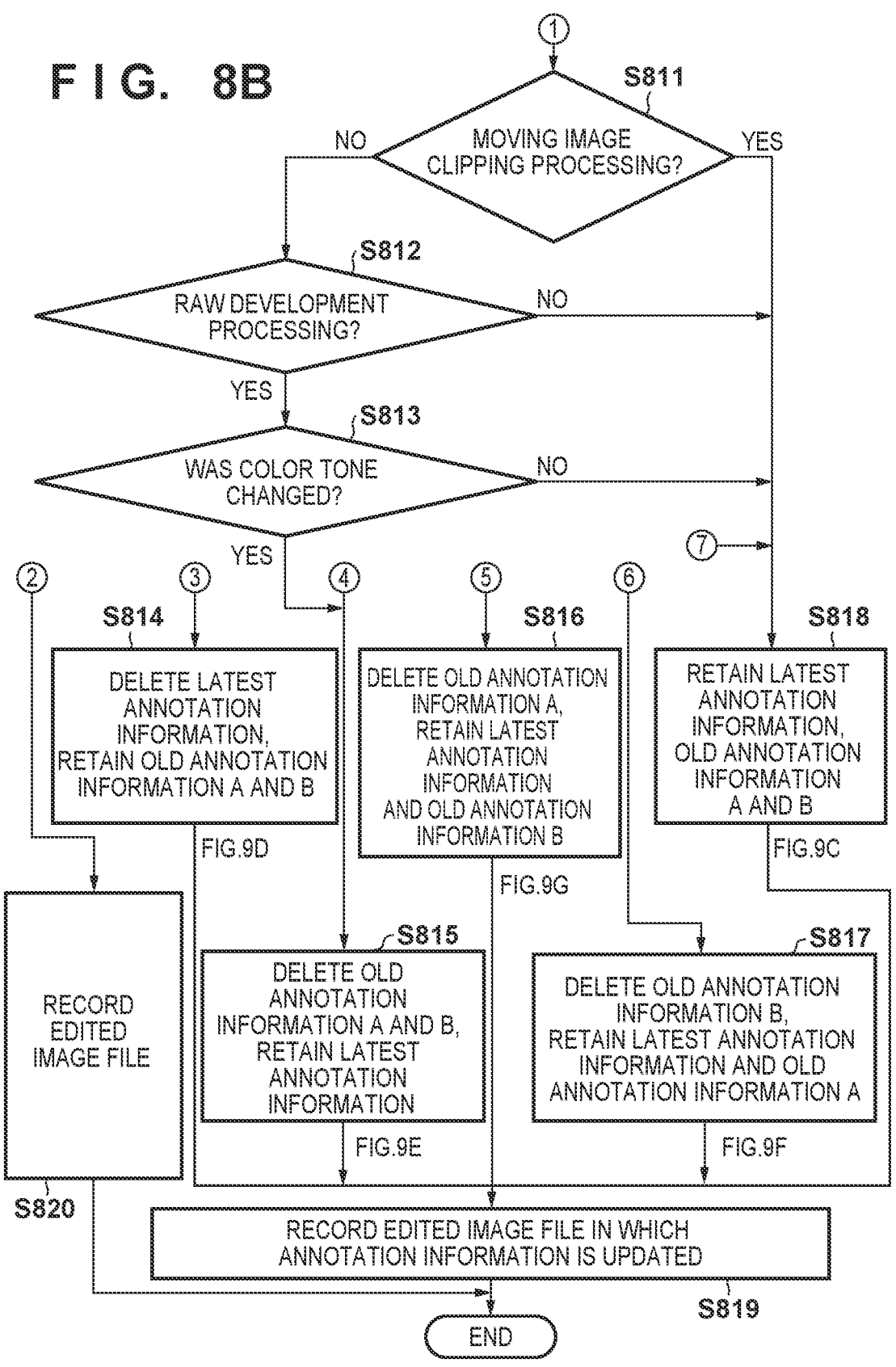
F I G. 8B

F I G.  9A
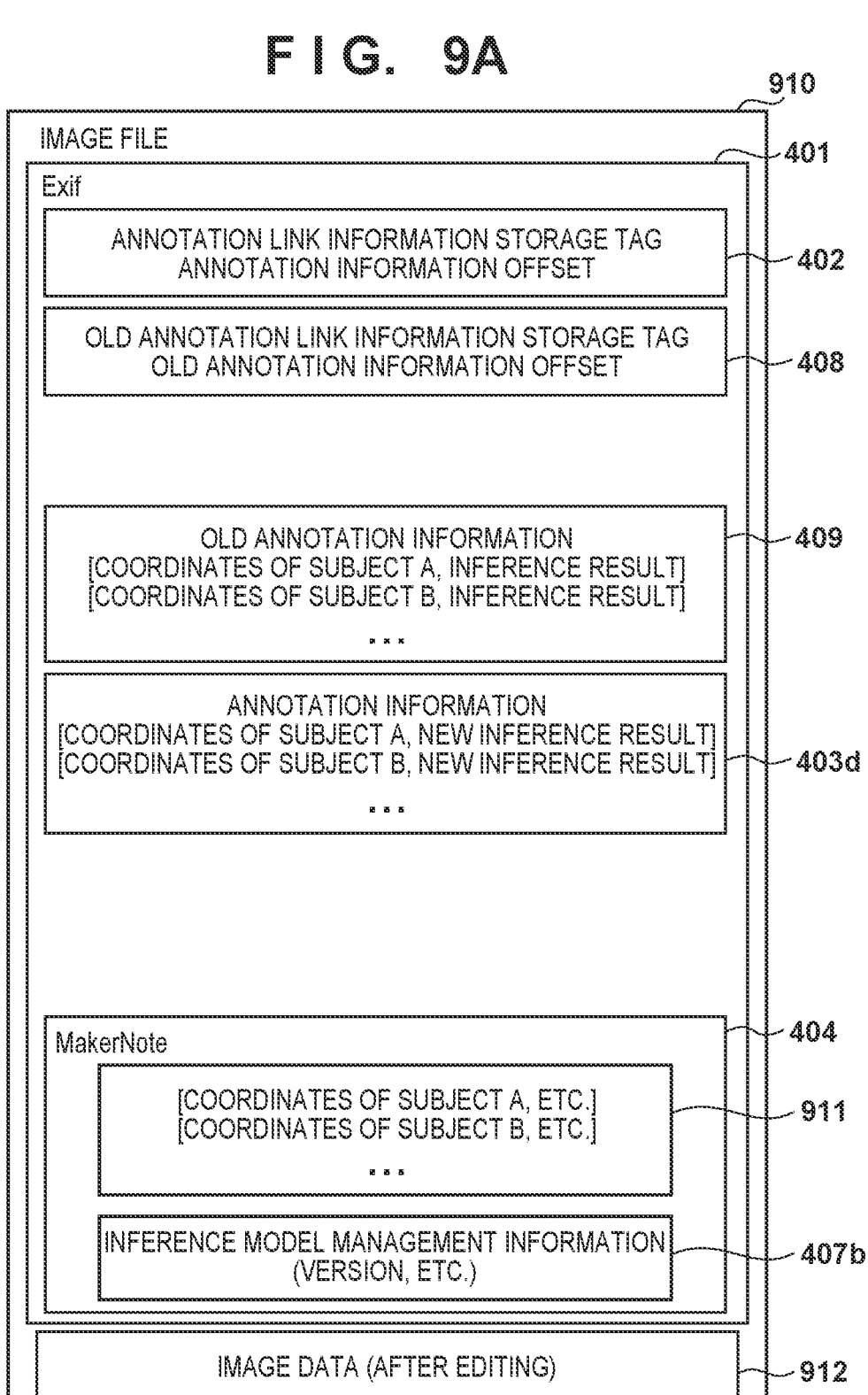

F I G. 9B

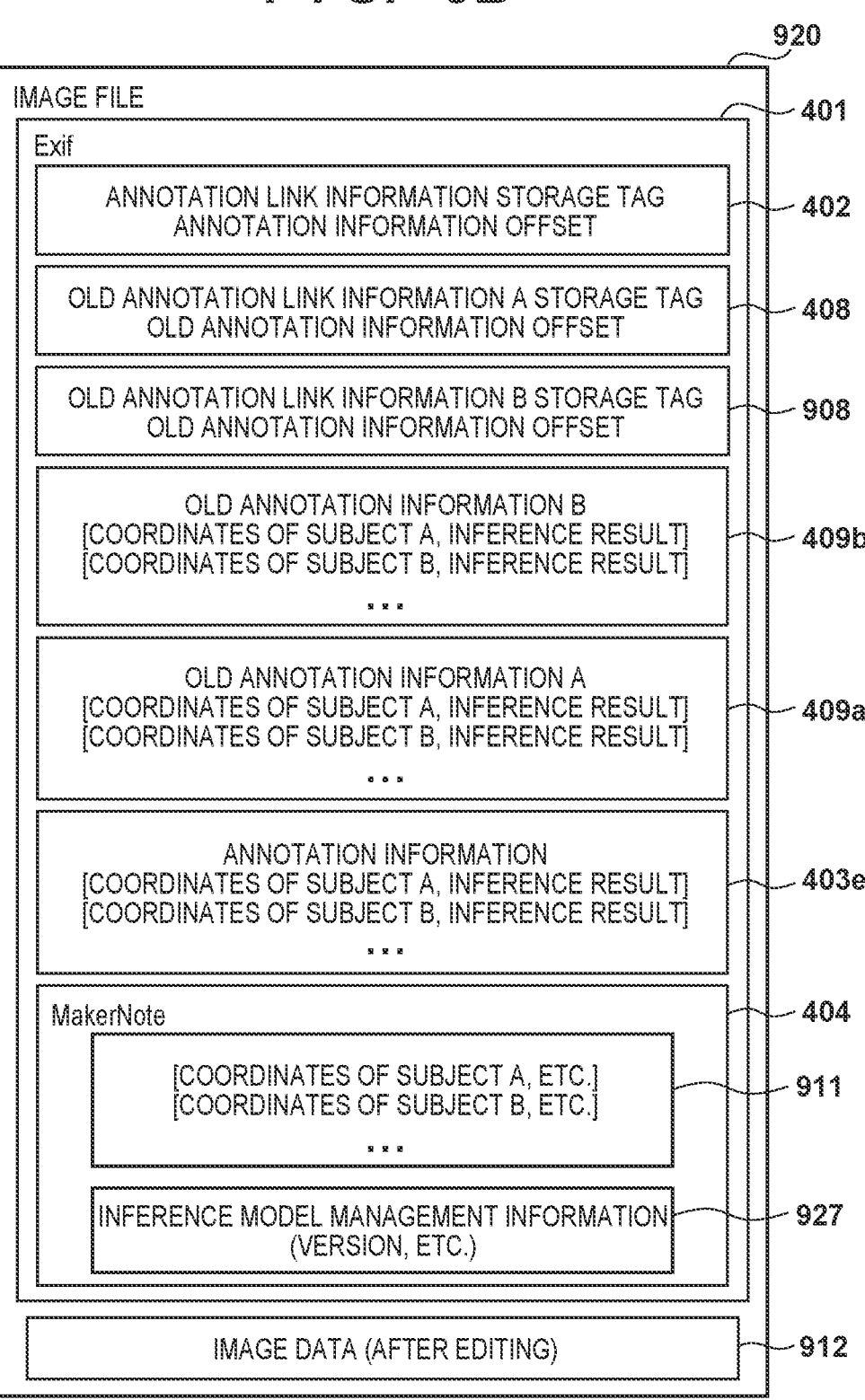

920

IMAGE FILE — 401

Exif

ANNOTATION LINK INFORMATION STORAGE TAG
ANNOTATION INFORMATION OFFSET — 402

OLD ANNOTATION LINK INFORMATION A STORAGE TAG
OLD ANNOTATION INFORMATION OFFSET — 408

OLD ANNOTATION LINK INFORMATION B STORAGE TAG
OLD ANNOTATION INFORMATION OFFSET — 908

OLD ANNOTATION INFORMATION B
[COORDINATES OF SUBJECT A, INFERENCE RESULT]
[COORDINATES OF SUBJECT B, INFERENCE RESULT]
. . . — 409b

OLD ANNOTATION INFORMATION A
[COORDINATES OF SUBJECT A, INFERENCE RESULT]
[COORDINATES OF SUBJECT B, INFERENCE RESULT]
. . . — 409a

ANNOTATION INFORMATION
[COORDINATES OF SUBJECT A, INFERENCE RESULT]
[COORDINATES OF SUBJECT B, INFERENCE RESULT]
. . . — 403e

MakerNote — 404

[COORDINATES OF SUBJECT A, ETC.]
[COORDINATES OF SUBJECT B, ETC.]
. . . — 911

INFERENCE MODEL MANAGEMENT INFORMATION
(VERSION, ETC.) — 927

IMAGE DATA (AFTER EDITING) — 912

FIG. 9C

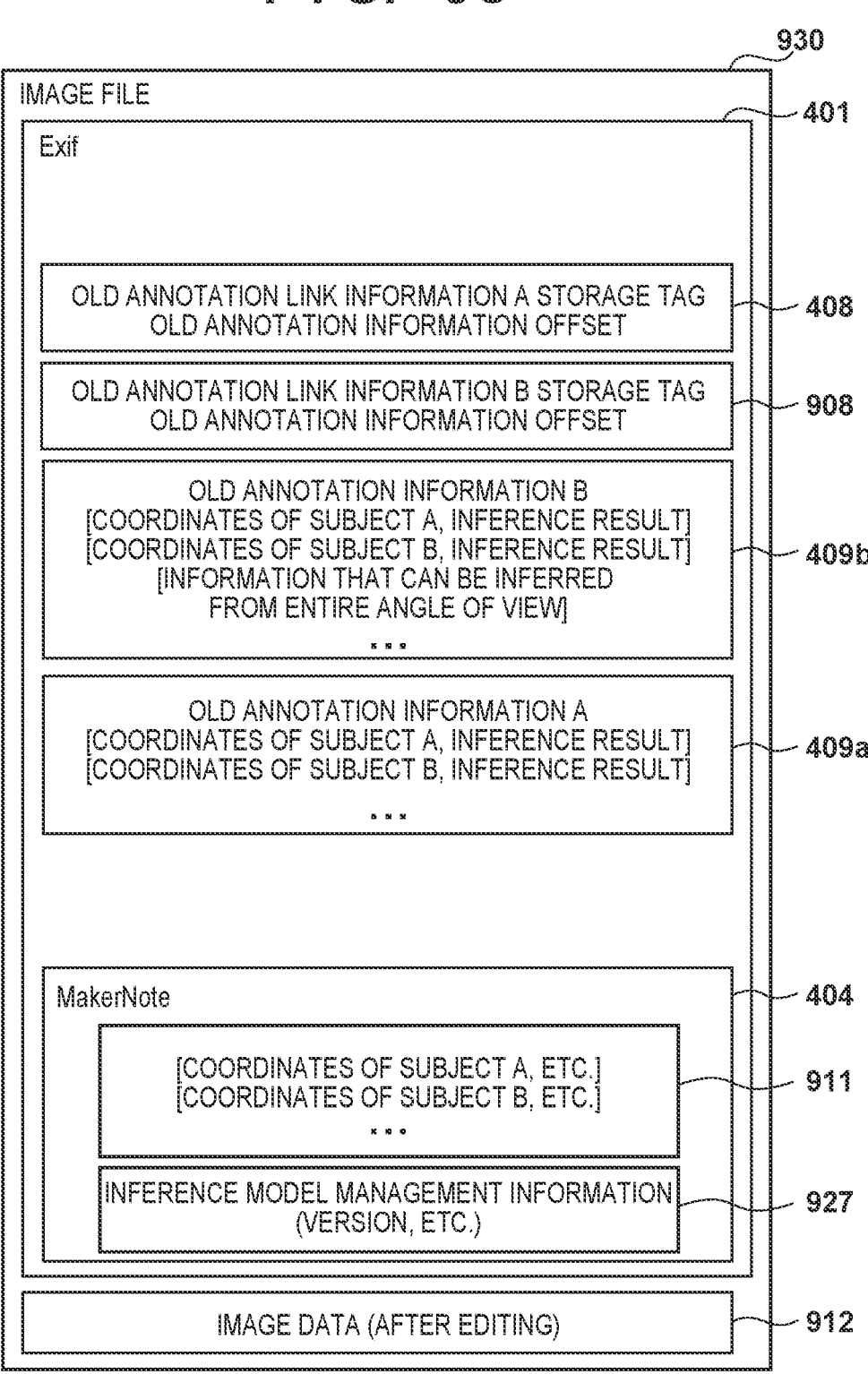

930

IMAGE FILE — 401

Exif

OLD ANNOTATION LINK INFORMATION A STORAGE TAG
OLD ANNOTATION INFORMATION OFFSET — 408

OLD ANNOTATION LINK INFORMATION B STORAGE TAG
OLD ANNOTATION INFORMATION OFFSET — 908

OLD ANNOTATION INFORMATION B
[COORDINATES OF SUBJECT A, INFERENCE RESULT]
[COORDINATES OF SUBJECT B, INFERENCE RESULT]
[INFORMATION THAT CAN BE INFERRED
FROM ENTIRE ANGLE OF VIEW]
. . . — 409b

OLD ANNOTATION INFORMATION A
[COORDINATES OF SUBJECT A, INFERENCE RESULT]
[COORDINATES OF SUBJECT B, INFERENCE RESULT]
. . . — 409a

MakerNote — 404

[COORDINATES OF SUBJECT A, ETC.]
[COORDINATES OF SUBJECT B, ETC.]
. . . — 911

INFERENCE MODEL MANAGEMENT INFORMATION
(VERSION, ETC.) — 927

IMAGE DATA (AFTER EDITING) — 912

940

IMAGE FILE — 401

Exif

ANNOTATION LINK INFORMATION STORAGE TAG
ANNOTATION INFORMATION OFFSET — 402

ANNOTATION INFORMATION
[COORDINATES OF SUBJECT A, INFERENCE RESULT]
[COORDINATES OF SUBJECT B, INFERENCE RESULT]
. . . — 403e

MakerNote — 404

[COORDINATES OF SUBJECT A, ETC.]
[COORDINATES OF SUBJECT B, ETC.]
. . . — 911

INFERENCE MODEL MANAGEMENT INFORMATION
(VERSION, ETC.) — 927

IMAGE DATA (AFTER EDITING) — 912

F I G. 9E

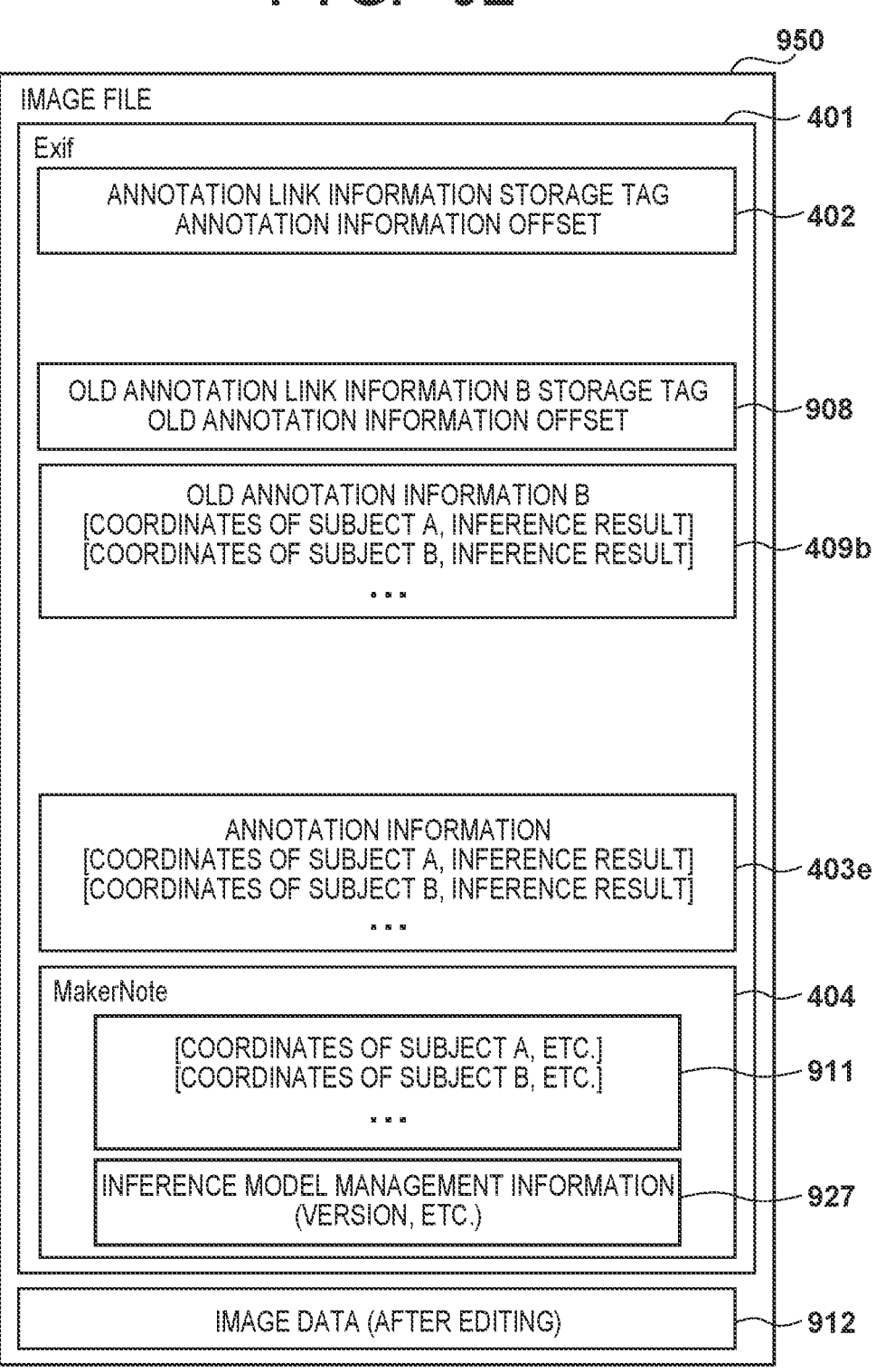

950

IMAGE FILE — 401

Exif

ANNOTATION LINK INFORMATION STORAGE TAG
ANNOTATION INFORMATION OFFSET — 402

OLD ANNOTATION LINK INFORMATION B STORAGE TAG
OLD ANNOTATION INFORMATION OFFSET — 908

OLD ANNOTATION INFORMATION B
[COORDINATES OF SUBJECT A, INFERENCE RESULT]
[COORDINATES OF SUBJECT B, INFERENCE RESULT]
. . . — 409b

ANNOTATION INFORMATION
[COORDINATES OF SUBJECT A, INFERENCE RESULT]
[COORDINATES OF SUBJECT B, INFERENCE RESULT]
. . . — 403e

MakerNote — 404

[COORDINATES OF SUBJECT A, ETC.]
[COORDINATES OF SUBJECT B, ETC.]
. . . — 911

INFERENCE MODEL MANAGEMENT INFORMATION
(VERSION, ETC.) — 927

IMAGE DATA (AFTER EDITING) — 912

F I G. 9F

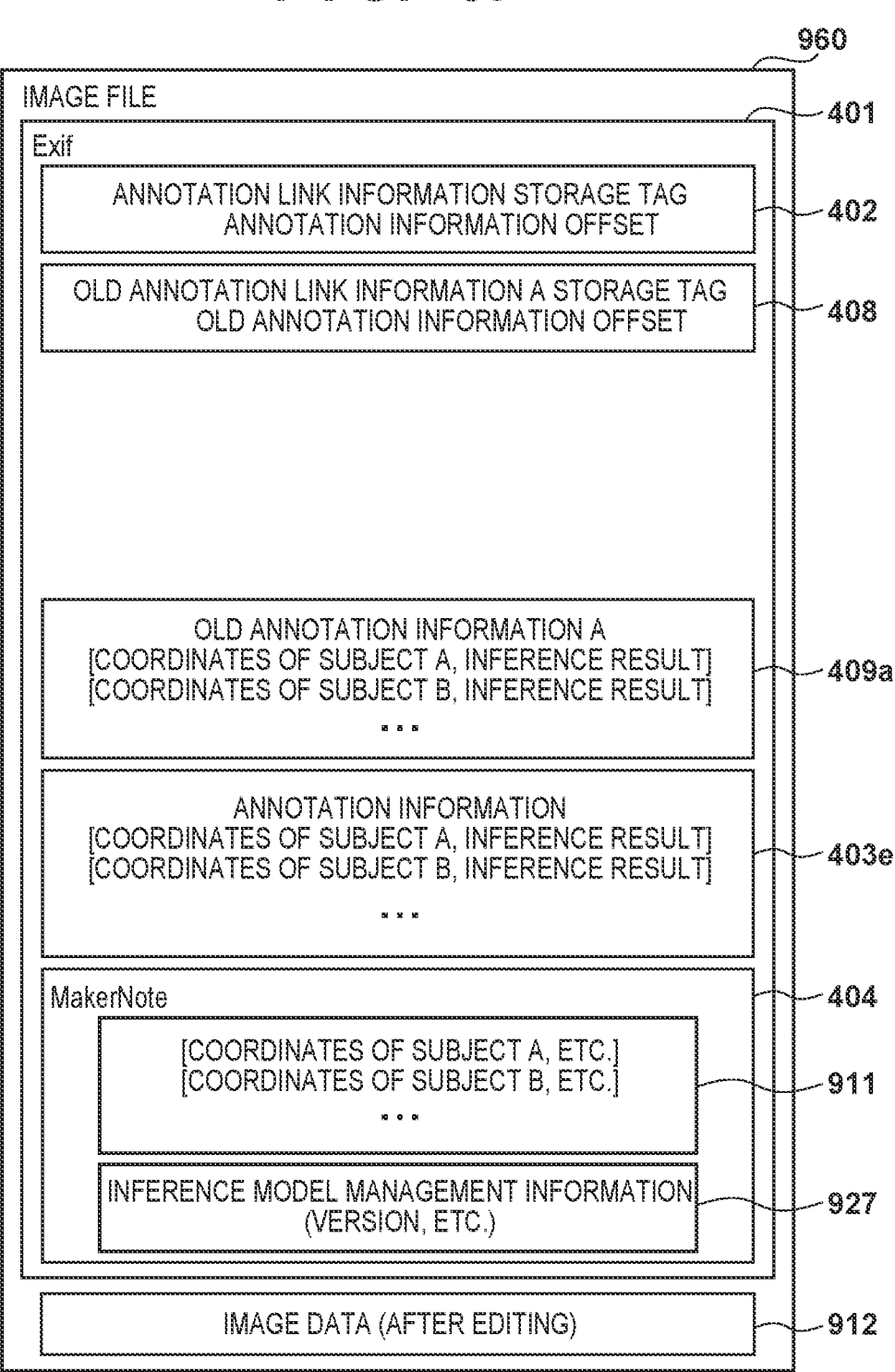

960

IMAGE FILE — 401

Exif

ANNOTATION LINK INFORMATION STORAGE TAG
ANNOTATION INFORMATION OFFSET — 402

OLD ANNOTATION LINK INFORMATION A STORAGE TAG
OLD ANNOTATION INFORMATION OFFSET — 408

OLD ANNOTATION INFORMATION A
[COORDINATES OF SUBJECT A, INFERENCE RESULT]
[COORDINATES OF SUBJECT B, INFERENCE RESULT]
. . . — 409a

ANNOTATION INFORMATION
[COORDINATES OF SUBJECT A, INFERENCE RESULT]
[COORDINATES OF SUBJECT B, INFERENCE RESULT]
. . . — 403e

MakerNote — 404

[COORDINATES OF SUBJECT A, ETC.]
[COORDINATES OF SUBJECT B, ETC.]
. . . — 911

INFERENCE MODEL MANAGEMENT INFORMATION
(VERSION, ETC.) — 927

IMAGE DATA (AFTER EDITING) — 912

IMAGE PROCESSING APPARATUS AND METHOD, AND IMAGE CAPTURING APPARATUS

CROSS-REFERENCE TO RELATED APPLICATIONS

This application is a Continuation of International Patent Application No. PCT/JP2021/042884, filed Nov. 24, 2021, which claims the benefit of Japanese Patent Application No. 2021-008938, filed Jan. 22, 2021, both of which are hereby incorporated by reference herein in their entirety.

BACKGROUND OF THE INVENTION

Field of the Invention

The present invention relates to an image processing apparatus and method for processing an image captured by a digital camera or the like, and an image capturing apparatus.

Background Art

In recent years, artificial intelligence (AI) technology such as deep learning is being utilized in various technical fields. For example, conventionally, digital still cameras and the like have been equipped with a function for detecting human faces from captured images, and PTL 1 further discloses techniques for accurately detecting and recognizing animals, such as dogs and cats, in addition to humans.

On the other hand, as subject detection technology evolves and the importance of detectable information increases, the input image as a detection target and the results of detection have become important information that can be used in various ways in subsequent workflows. For example, various information estimated from images using AI technology is very important input data in various fields such as automation of robots and automatic driving of vehicles.

CITATION LIST

Patent Literature

PTL 1 Japanese Patent Laid-Open No. 2015-099559

However, it does not mention how to manage the information detected from the input image.

The present invention has been made in consideration of the above situation, and appropriately manages estimation results of subjects in images.

SUMMARY OF THE INVENTION

According to the present invention, provided is an image processing apparatus comprising one or more processors and/or circuitry which function as: a detection unit that detects a subject from an image; an inference unit that performs inference processing using an inference model on the detected subject; and a generation unit that generates an image file by combining image data of the image, information of the subject, an inference result of the inference processing, and information of the inference model, wherein the generation unit records the inference model in a private area of the image file.

Further, according to the present invention, provided is an image capturing apparatus comprising: an image processing apparatus comprising one or more processors and/or circuitry which function as: a detection unit that detects a subject from an image; an inference unit that performs inference processing using an inference model on the detected subject; and a generation unit that generates an image file by combining image data of the image, information of the subject, an inference result of the inference processing, and information of the inference model, and an image sensor that senses the image, wherein the generation unit records the inference model in a private area of the image file.

Furthermore, according to the present invention, provided is an image processing method comprising: detecting a subject from an image; performing inference processing using an inference model on the detected subject; and generating an image file by combining image data of the image, information of the subject, an inference result of the inference processing, and information of the inference model, wherein the inference model is recorded in a private area of the image file.

Further, according to the present invention, provided is a non-transitory computer-readable storage medium, the storage medium storing a program that is executable by the computer, wherein the program includes program code for causing the computer to function as an image processing apparatus comprising: a detection unit that detects a subject from an image; an inference unit that performs inference processing using an inference model on the detected subject; and a generation unit that generates an image file by combining image data of the image, information of the subject, an inference result of the inference processing, and information of the inference model, wherein the generation unit records the inference model in a private area of the image file.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 2 is a flowchart showing shooting processing of the digital camera according to the embodiment.

FIG. 3A is a flowchart showing playback processing of the digital camera according to the embodiment.

FIG. 3B is a flowchart showing the playback processing of the digital camera according to the embodiment.

FIG. 5C is a diagram showing an outline of recorded contents of an image file recorded in the digital camera according to the embodiment.

FIG. 5D is a diagram showing an outline of recorded contents of an image file recorded in the digital camera according to the embodiment.

FIG. 6 is a flowchart showing transmission processing of the digital camera according to the embodiment.

FIG. 7E is a diagram showing an outline of recorded contents of an image file during transmission processing of the digital camera according to the embodiment.

FIG. 7F is a diagram showing an outline of recorded contents of an image file during transmission processing of the digital camera according to the embodiment.

FIG. 8B is a flowchart showing the editing processing in the digital camera according to the present embodiment.

FIG. 9A is a diagram showing an outline of recorded contents of an image file during editing processing of the digital camera according to the present embodiment.

FIG. 9B is a diagram showing an outline of recorded contents of an image file during editing processing of the digital camera according to the present embodiment.

FIG. 9C is a diagram showing an outline of recorded contents of an image file during editing processing of the digital camera according to the present embodiment.

FIG. 9E is a diagram showing an outline of recorded contents of an image file during editing processing of the digital camera according to the present embodiment.

FIG. 9F is a diagram showing an outline of recorded contents of an image file during editing processing of the digital camera according to the present embodiment.

DESCRIPTION OF THE EMBODIMENTS

Figure 1:
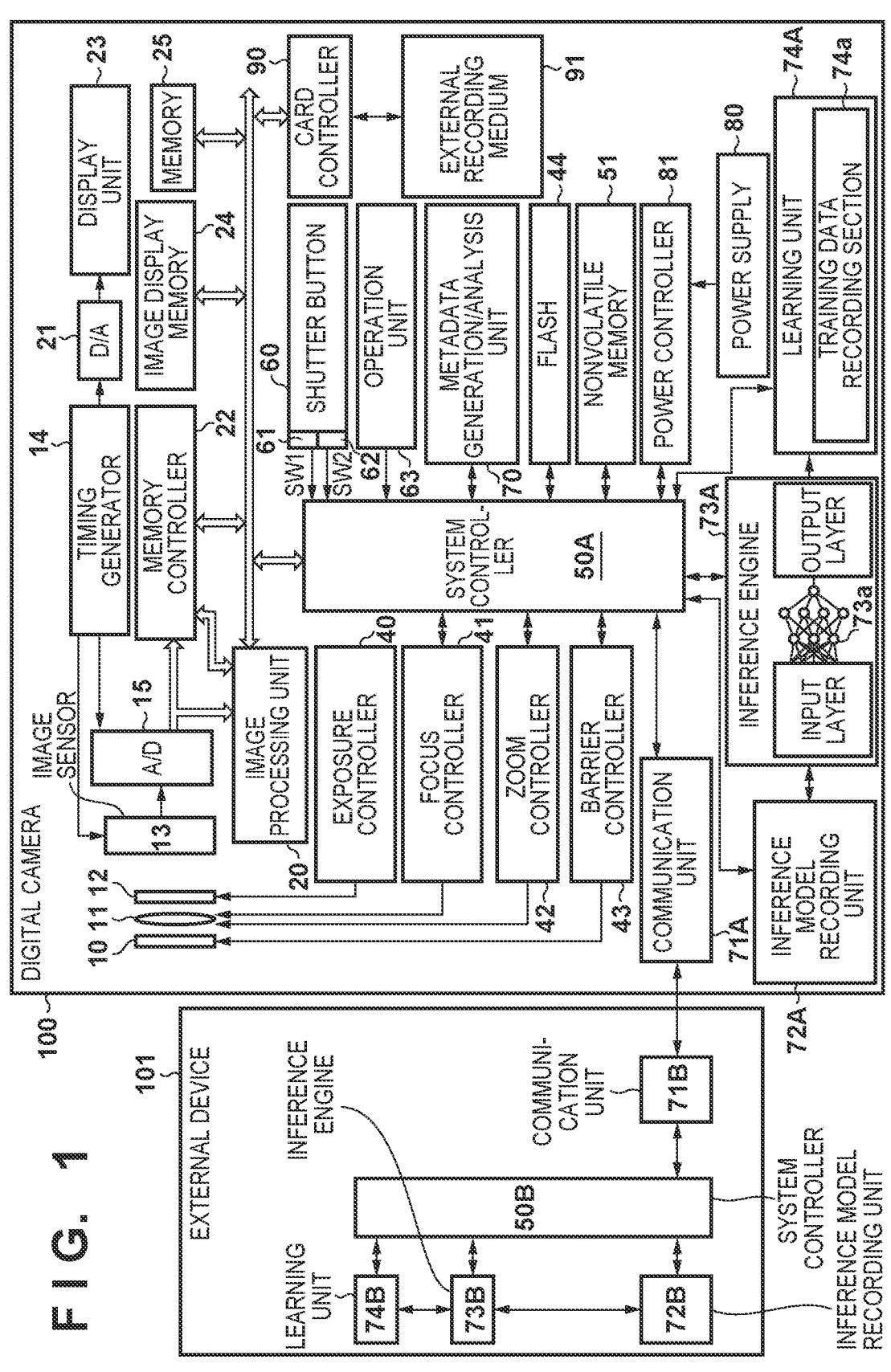
FIG. 1 is a block diagram showing a schematic configuration of a digital camera according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following description, a digital camera will be exemplified as an image output apparatus that uses an inference model to classify subjects, however, the image output apparatus of the present invention is not limited to a digital camera. The image output apparatus of the present invention may be any apparatus as long as it reads an image recorded in a recording device and displays it on a display device. For example, it may be a smartphone, a tablet PC, or the like.

FIG. 1 is a block diagram showing a configuration example of a digital camera 100 according to an embodiment of the present invention.

A barrier 10 is a protective member that prevents dirt and damage to the imaging unit by covering the imaging unit including an imaging lens 11 of the digital camera 100, and its operation is controlled by a barrier controller 43. The imaging lens 11 forms an optical image on the imaging surface of an image sensor 13. A shutter 12 has an aperture function. The image sensor 13 is composed of, for example, a CCD, CMOS sensor, or the like, and converts an optical image formed on the imaging surface by the imaging lens 11 via the shutter 12 into an electrical signal.

An A/D converter 15 converts the analog image signal output from the image sensor 13 into a digital image signal. The digital image signal converted by the A/D converter 15 is written in a memory 25 as so-called RAW image data. At the same time, development parameters corresponding to each piece of RAW image data are generated based on information on the shooting, and written to the memory 25. The development parameters are comprised of various parameters used in image processing for recording in the JPEG method, such as parameters for exposure settings, white balance, color space, and contrast.

A timing generator 14 is controlled by a memory controller 22 and a system controller 50A, and supplies clock signals and control signals to the image sensor 13, A/D converter 15, and D/A converter 21.

An image processing unit 20 performs various image processing such as predetermined pixel interpolation processing, color conversion processing, correction processing, and resizing processing on data from the A/D converter 15 or data from the memory controller 22. The image processing unit 20 also performs predetermined image processing and arithmetic processing using image data obtained by shooting, and provides the obtained arithmetic results to the system controller 50A. The system controller 50A performs autofocus (AF) processing, automatic exposure (AE) processing, and flash pre-emission (EF) processing by controlling an exposure controller 40 and a focus controller 41 based on the provided calculation results.

Further, the image processing unit 20 also performs predetermined arithmetic processing using image data obtained by shooting, and also performs auto white balance (AWB) processing based on the obtained arithmetic results. Furthermore, the image processing unit 20 reads out the image data stored in the memory 25 and performs compression processing or decompression processing according to, for example, JPEG, MPEG-4 AVC or HEVC (High Efficiency Video Coding) on the image data, lossless compression processing on uncompressed RAW data. The image processing unit 20 then writes the processed image data to the memory 25.

Also, the image processing unit 20 performs predetermined arithmetic processing using image data obtained by shooting, and edits various image data. Specifically, trimming processing that adjusts the display range and size of the image by hiding unnecessary parts in peripheral of the image data, and resizing processing that changes the size of the image data and screen display elements by enlarging or reducing them can be performed. Furthermore, the image processing unit 20 can perform RAW development by applying image processing such as color conversion to data that has undergone compression processing or decompression processing such as lossless compression on uncompressed RAW data, convert it to JPEG format to create image data. In addition, it is possible to perform moving image clipping processing for extracting a specified frame of a moving image in a moving image format such as MPEG-4, converting it into JPEG format, and saving it.

The image processing unit 20 also performs processing for superimposing on-screen display (OSD) such as menus and arbitrary characters to be displayed on a display unit 23 together with the image data for display.

Furthermore, the image processing unit 20 performs subject detection processing by using the input image data and distance information to a subject obtained from the image sensor 13 at the time of shooting, etc., and detects the subject existing in the image data and the subject area. As the detectable information of a subject, it is possible to obtain information such as the position in the image, the area such as the size, the inclination, and the probability.

The memory controller 22 controls the A/D converter 15, the timing generator 14, the image processing unit 20, an image display memory 24, a D/A converter 21, and the memory 25. The RAW image data generated by the A/D converter 15 is written into an image display memory 24 or the memory 25 via the image processing unit 20 and the memory controller 22, or directly via the memory controller 22.

The image data for display written in the image display memory 24 is displayed on the display unit 23 constituted by a TFT LCD or the like via the D/A converter 21. By sequentially displaying image data obtained by shooting on the display unit 23, it is possible to realize an electronic viewfinder function for displaying a live image.

The memory 25 has a storage capacity sufficient to store a predetermined number of still images and moving images for a predetermined time, and stores captured still images and moving images. Further, the memory 25 can also be used as a work area for the system controller 50A.

The exposure controller 40 controls the shutter 12 having an aperture function. The exposure controller 40 also has an electronic flash function by interlocking with a flash 44. The focus controller 41 performs focus adjustment by driving a focus lens (not shown) included in the imaging lens 11 based on instructions from the system controller 50A. A zoom controller 42 controls zooming by driving a zoom lens (not shown) included in the imaging lens 11. The flash 44 has an AF auxiliary light projection function and an electronic flash function.

The system controller 50A controls the digital camera 100 as a whole. A nonvolatile memory 51 is an electrically erasable/recordable nonvolatile memory, and for example, an EEPROM or the like is used. Note that the nonvolatile memory 51 stores not only programs but also map information and the like.

A shutter switch 61 (SW1) is turned on when the shutter button 60 is operated halfway, and instructs the start of operations such as AF processing, AE processing, AWB processing, and EF processing. A shutter switch 62 (SW2) is turned ON when the operation of a shutter button 60 is completed, and instructs the start of a series of shooting operations including exposure processing, development processing, and recording processing. In exposure processing, signals read from the image sensor 13 are written to the memory 25 as RAW image data via the A/D converter 15 and memory controller 22. In the development processing, the RAW image data written in the memory 25 is developed using calculations in the image processing unit 20 and the memory controller 22, and written in the memory 25 as image data. In the recording processing, image data is read from the memory 25, compressed by the image processing unit 20, stored in the memory 25, and then written to an external recording medium 91 via a card controller 90.

An operation unit 63 includes operation members such as various buttons and a touch panel. For example, it includes a power button, a menu button, a mode changeover switch for switching between shooting mode/playback mode/other special shooting modes, a cross key, a set button, a macro button, and a multi-screen playback page break button. Further, for example, it also includes a flash setting button, a single shooting/continuous shooting/self-timer changeover button, a forward (+) menu item selection button, a backward (−) menu item selection button, an image quality selection button, an exposure compensation button, a date/time setting button, and so forth.

When the image data is recorded in the external recording medium 91, a metadata generation/analysis unit 70 generates metadata in various formats such as exchangeable image file format (Exif) standard to be attached to the image data based on the information at the time of shooting. Further, when the image data recorded in the external recording medium 91 is read, the metadata generation/analysis unit 70 analyzes the metadata added to the image data. The metadata includes, for example, shooting setting information at the time of shooting, image data information related to image data, feature information of a subject included in the image data, and the like. Further, when recording moving image data, the metadata generation/analysis unit 70 can also generate and add metadata for each frame.

A power supply 80 includes a primary battery such as an alkaline battery or a lithium battery, or the like, a secondary battery such as a NiCd battery, a NiMH battery, a Li battery, or the like, and an AC adapter. A power controller 81 supplies power supplied from the power supply 80 to each unit of the digital camera 100.

A card controller 90 transmits and receives data to and from an external recording medium 91 such as a memory card. The external recording medium 91 is composed of, for example, a memory card, and records images (still images and moving images) taken by the digital camera 100.

An inference engine 73A uses the inference model recorded in an inference model recording unit 72A to perform inference on image data input via the system controller 50A. As the inference model, it is possible to use an inference model that is input from outside such as an external device 101 through a communication unit 71A and recorded in the inference model recording unit 72A, or an inference model obtained by re-learning by a learning unit 74A. The inference model retains a management version in the inference model recording unit 72A or the like so that each inference model can be identified when it is updated from outside or updated by re-learning by the learning unit 74A. It is assumed that the inference engine 73A also has a neural network design 73a.

The neural network design 73a has intermediate layers (neurons) between an input layer and an output layer. Image data is input to the input layer from the system controller 50A. As the intermediate layers, several layers of neurons are arranged. The number of layers of neurons is appropriately determined in terms of design, and the number of neurons in each layer is also determined appropriately in terms of design. The intermediate layers are weighted based on the inference model recorded in the inference model recording unit 72A. Annotation information corresponding to image data input to the input layer is output to the output layer.

In this embodiment, an inference model is assumed for inferring the classification of what the subject included in the image is. Using image data of various subjects and their classification results (for example, classification of animals such as dogs and cats, classification of subjects such as people, animals, plants, and buildings) as training data, an inference model generated by the external device 101 or the like is used as the inference model generated by deep learning. However, since the inference engine 73A can be updated from the external device 101, or the like, various other inference models may be used.

The learning unit 74A receives a request from the system controller 50A etc. and re-learns the inference model. The learning unit 74A has a training data recording section 74*a*, and the training data recording section 74*a* records information about training data to be used in the inference engine 73A. The learning unit 74A can make the inference engine 73A re-learn using the training data recorded in the training data recording section 74*a*, and update the inference engine 73A using the inference model recording unit 72A.

The communication unit 71A has communication circuitry for transmitting and receiving. Specifically, the communication circuitry may be for wireless communication such as Wi-Fi and Bluetooth (registered trademark), or for wired communication such as Ethernet and USB. The communication unit 71A can communicate with a communication unit 71B of the external device 101. The communication unit 71A functions as a communication unit that transmits and receives not only image files with annotation information created by the inference engine 73A, but also various information such as inference models and training data to and from the system controllers 50A and 50B. Also, depending on whether the external device 101 is associated with the camera, it is possible to limit the information to be transmitted.

The external device 101 has a learning unit 74B, an inference engine 73B, an inference model recording unit 72B, the system controller 50B, and the communication unit 71B. Alternatively, a device that does not have these configurations may be used. The learning unit 74B creates an inference model upon receiving a request from outside, such as the inference engine 73B, system controller 50B, or the like. The inference model recording unit 72B records the inference model transmitted from the digital camera 100 and the inference model created by the learning unit 74B.

Next, shooting processing of the digital camera 100 in this embodiment will be described with reference to FIG. 2.

When the shooting mode is instructed by the mode changeover switch included in the operation unit 63, the processing is started. In step S201, it is checked whether or not a still image shooting is instructed by the user pressing the shutter button 60 to turn on the shutter switches 61 (SW1) and 62 (SW2), and if the still image shooting is instructed, the process proceeds to step S202.

In step S202, shooting processing is performed. In the shooting processing, autofocus (AF) processing and automatic exposure (AE) processing are performed using the focus controller 41 and exposure controller 40, and the image signal output from the image sensor 13 via the A/D converter 15 is saved in the memory 25. Further, the image signal stored in the memory 25 is compressed in JPEG format or MPEG-4 HEVC format by compression processing in the image processing unit 20 according to the user's settings, and image data is generated.

In step S203, the image signal stored in the memory 25 is subjected to subject detection processing by the image processing unit 20, and subject detection information of a subject/subjects included in the image is obtained.

Figures 5A, 5B:
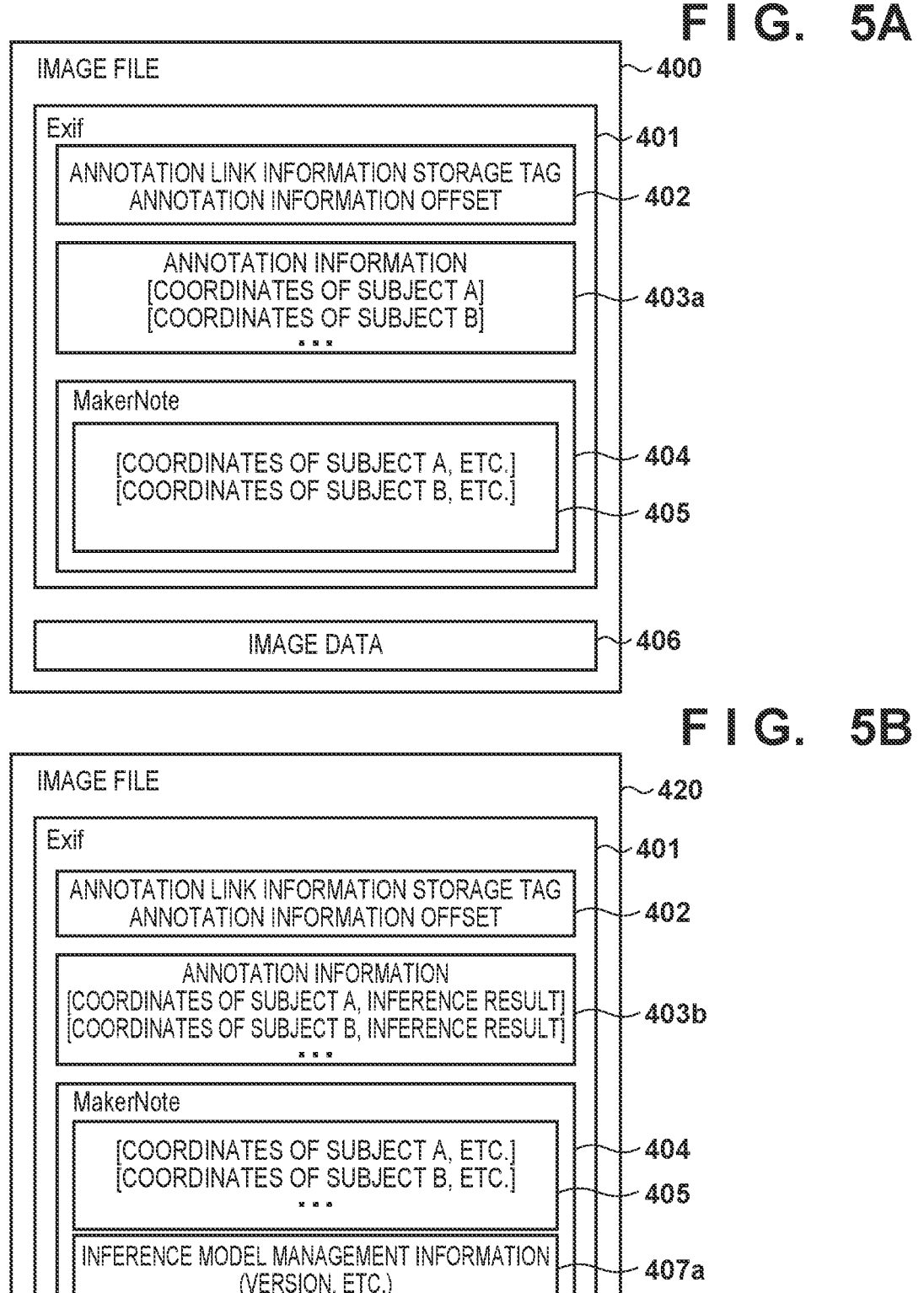
FIG. 5A is a diagram showing an outline of recorded contents of an image file recorded in the digital camera according to the embodiment.
FIG. 5B is a diagram showing an outline of recorded contents of an image file recorded in the digital camera according to the embodiment.

In step S204, the image data created in step S202 and the object detection information acquired in step S203 are recorded in the external recording medium 91 as an image file. The image file recorded here has a format as shown in FIG. 5A. An image file 400 recorded in this embodiment is composed of at least an area for storing metadata conforming to the Exif standard and an image data area for recording compressed image data 406. The image file 400 is recorded in the JPEG format, for example, if the user instructs recording in the JPEG format, and Exif data 401 is recorded in the APP1 marker or the like. Further, if the user instructs recording in the High Efficiency Image File Format (HEIF) format, the data is recorded in the HEIF file format, and the Exif data 401 is recorded in a metadata box or the like. Similarly, if recording in the RAW format is instructed, the Exif data 401 is recorded in a predetermined area such as the metadata box.

The subject detection information acquired in step S203 is stored in MakerNote 404 using the metadata generation/analysis unit 70, in which the manufacturer-specific metadata included in the Exif data 401 can be described in an undisclosed format in principle. Furthermore, the subject detection information is recorded in annotation information 403*a* recorded at a position indicated by an annotation information offset included in annotation link information storage tag 402. The subject detection information recorded in the annotation information 403*a* is used as annotation information as input data to the inference engine 73A in the inference processing described later. In the example shown in FIG. 5A, the annotation information 403*a* records only the coordinates of the subject in the screen, but may include other information.

In step S205, it is confirmed whether inference processing using the inference engine 73A can be performed. For example, if the inference engine 73A is processing another image, or if the shutter button 60 is operated so that the shutter switch 62 (SW2) remains ON, continuous shooting is instructed and the shooting processing should be prioritized, inference processing cannot be performed. If the inference processing cannot be performed, the process proceeds to step S208, and if the inference processing can be executed, the process proceeds to step S206.

In step S206, inference processing is performed on the image file 400 using the inference engine 73A. In this embodiment, the image file 400 is input as an input to the inference engine 73A. A subject area/areas included in the image data is/are specified from the image data 406 and the annotation information 403*a* in the image file 400, and as a result of inference using the inference engine 73A for each subject area, the classification result of the subject included in the subject area is output. At the time of inference, in addition to the inference result, information related to the inference processing, such as debug information on operations during inference and logs may be output.

In step S207, the subject classification result, which is the inference result obtained in step S206, and the current inference model management version and debug information held in the inference model recording unit 72A, if any, as inference model management information, are recorded in an image file. FIG. 5B shows an image file 420 after recording the inference results and inference model management information in the image file 400 of FIG. 5A. In the image file 420, the metadata generation/analysis unit 70 is used to record the inference result in annotation information 403*b* for the position coordinates of each subject, and inference model management information 407*a* is additionally written in the MakerNote 404.

In this embodiment, an example is shown in which the annotation information is a combination of the position coordinates and the inference result, however, information output as an inference result of the inference model at least has to be recorded in the annotation information 403*b*. For example, the output result may be recorded as it is, or in any recording format or format such as text format or binary format. By recording the image data 406 and the inference result in the same file in this way, the image data 406 and the inference result can be efficiently associated and easily managed without having to separately manage them. In addition, since the inference model management information 407*a* is unique data used by the manufacturer who manages the inference model, by not being disclosed to the general public, and recorded in the private MakerNote 404, it can be safely managed in association with the inference result.

In step S208, when the user instructs completion of shooting by the mode changeover switch or by turning off the power supply by the power button included in the operation unit 63, the shooting processing is ended.

Next, the playback processing of the digital camera 100 according to this embodiment will be described with reference to FIGS. 3A and 3B.

In the digital camera 100, when the playback mode is instructed by the mode changeover switch included in the operation unit 63, playback processing for viewing image data recorded on the external recording medium 91 is started. When the playback processing is started, in step S301, one image file to be played is specified, read out from the external recording medium 91, and stored in the memory 25 via the card controller 90.

In step S302, the image processing unit 20 performs decompression processing, resizing processing, etc. according to the recording method on the image file read out to the memory 25, converts it into image data for display, and records it in the image display memory 24, and the image is displayed on the display unit 23.

In step S303, the metadata generation/analysis unit 70 is used to confirm whether an inference result is recorded in the image file currently being displayed. If an inference result is recorded, the process proceeds to step S304, and if no inference result is recorded, the process proceeds to step S309.

In step S304, if there is an instruction from the user to display the inference result recorded in the image file using the operation member included in the operation unit 63, the process proceeds to step S305, and if there is no such instruction, the process proceeds to step S309.

In step S305, the metadata generation/analysis unit 70 is used to extract information about the inference result from the annotation information 403*b*, and the image processing unit 20 is used to superimpose and display the extracted information on the image data being displayed. For example, together with a frame indicating the area specified by the coordinates of each subject described in the annotation information 403*b*, an inference result of classification of the subject existing in the area specified by the coordinates is displayed with a character string, thereby enabling the inference result associated with the image data to be seen by the user.

In step S306, as a result of referring to the inference result displayed in step S305, it is checked whether or not the user has instructed to correct the inference result using the operation members included in the operation unit 63 because the user noticed an error, etc. If there is an instruction to correct the inference result, the process proceeds to step S307, and if there is no such instruction, the process proceeds to step S309.

In step S307, an instruction to correct the inference result is obtained, and an image file 430 shown in FIG. 5C is created as training data for the inference model, and recorded in the training data recording section 74*a*. Note that the image file 430 may also be recorded in the external recording medium 91 as a file different from the image file 420. The image file 430 is created based on the image file 420, and the metadata generation/analysis unit 70 is used to add the data instructed to be corrected by the user as correct data for each area specified by the coordinates of each subject in the screen in the annotation information 403*c* recorded at the position indicated by the annotation information offset included in the annotation link information storage tag 402. The annotation information 403*b* in the image file 420 is recorded as old annotation information 409 at the position indicated by the old annotation information offset included in an old annotation link information storage tag 408.

Next, in step S308, the learning unit 74A is used to make the inference engine 73A relearn using the image file 430 created in step S307 as training data, and update the inference engine 73A. Along with the update, the inference model recording unit 72A updates the management version of the inference engine 73A.

In step S309, it is confirmed whether or not the user has instructed to perform inference processing on the image file being displayed by using the operation members included in the operation unit 63. For example, if the user wants to perform inference processing on an image file that could not be inferred at the time of shooting, or if the inference model is updated from the outside and the user wants to perform inference processing again on a recorded image file, inference processing may be instructed. If the inference processing is instructed, the process proceeds to step S310.

At step S310, it is checked whether or not an inference result is recorded in the image file for which inference processing is instructed, and if no inference result is recorded, the processes the same as those in steps S206 and S207 are performed in steps S312 and S313, and an inference result and inference model management information are recorded in the image file. If the inference result is recorded, the process advances to step S311 to perform re-inference processing.

Figure 4:
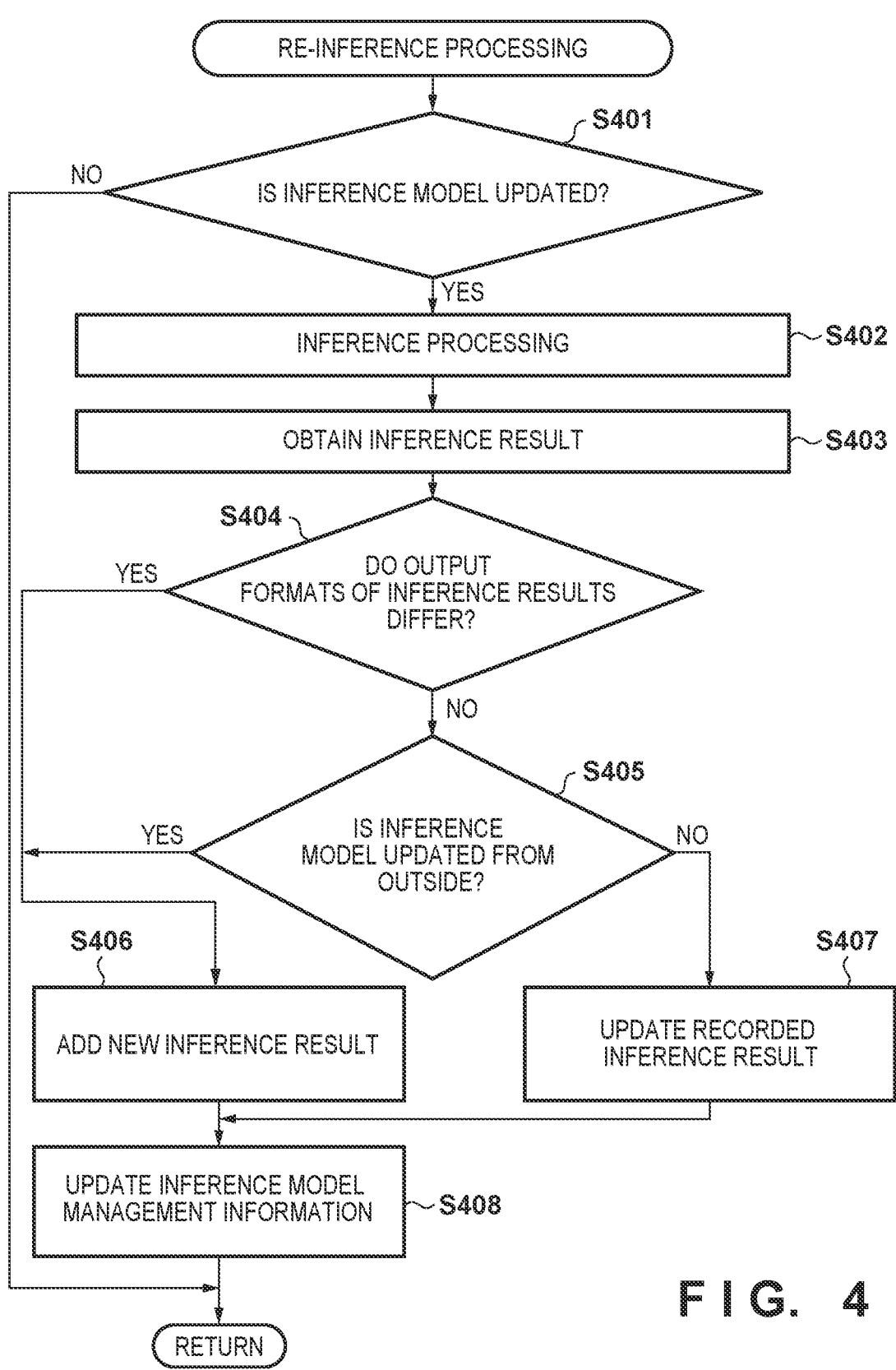
FIG. 4 is a flowchart showing re-inference processing of the digital camera according to the embodiment.

Here, the re-inference processing performed in step S311 will be described with reference to FIG. 4.

In the re-inference processing, in step S401, the metadata generation/analysis unit 70 is used to extract inference model management information recorded in the image file for which inference has been instructed. Then, a management version included in the inference model management information is compared with the management version of the inference engine 73A managed by the inference model recording unit 72A to confirm whether the management version of the inference engine 73A is updated. If the management version of the inference engine 73A is older than or the same as the management version recorded in the image file, no process is performed and the processing ends. If updated, the process proceeds to step S402.

In step S402, the same process as in step S206 is performed. For example, when re-inference processing is performed on the image file 420, the subject area included in the image data 406 is specified from the image data 406 and the annotation information 403*b* in the image file 420. Then, inference is performed for each subject area using the inference engine 73A, and in step S403, an inference result is obtained for each subject area.

In step S404, it is determined whether or not the inference result obtained in step S403 has an output format different from that of the inference result of the annotation information 403*b* recorded in the image file 420. Examples of cases in which the output formats are different includes a case in which the inference engine 73A is updated to enable more detailed classification, and new items such as details are added to the classification result and output. If the output formats are different, the process proceeds to step S406.

On the other hand, in the case where the output formats are same, in step S405, it is determined whether or not updating of the inference model is managed from the outside with regard to the management version of the inference engine 73A managed by the inference model recording unit 72A, and the inference model is updated. If it is updated from the outside, the process proceeds to step S406.

In step S406, the metadata generation/analysis unit 70 is used to format the image file 440 as shown in FIG. 5D and record it in the external recording medium 91. In the image file 440, the result of re-inference is recorded in annotation information 403*d* recorded at the position indicated by the annotation information offset included in the annotation link information storage tag 402 in the original image file 420.

On the other hand, the annotation information 403*b* which has been recorded in the image file 420 is recorded as the old annotation information 409 at the position indicated by the old annotation information offset included in the old annotation link information storage tag 408. As a result, both old inference results and new inference results can be recorded in association with the image data, and this makes it possible to easily manage the transition of the inference results of the image data.

Also, in the present embodiment, an inference model for inferring the classification of the subject is assumed, but there are various inference models other than classification as the inference model. Even in a case where inference processing is performed using different inference models, the inference results of a plurality of different inference models can be efficiently associated with one image data in one file by using this embodiment, which makes it possible to easily manage the file.

In step S405, if the inference model is not updated from the outside, in step S407, only the inference result portion of the annotation information 403*b* of the image file 420 is updated using the metadata generation/analysis unit 70, and the process proceeds to step S408.

In step S408, using the metadata generation/analysis unit 70, the inference model management information 407*a* in the MakerNote 404 of the image file 440 is updated to inference model management information 407*b*, which is the current information of the inference engine 73A.

Returning to FIG. 3B, in step S314, if the operation member included in the operation unit 63 is used to issue a playback instruction of another image, the process returns to step S301 to repeat the above-described processes for the instructed image to be played back. On the other hand, if a playback instruction of another image is not issued, it is determined in step S315 whether or not the end of the playback processing is instructed. If the end of the playback processing is not instructed, the process returns to step S303 to repeat the above-described processes, and if the end of the playback processing is instructed, the playback processing is ended.

Next, the transmission processing performed in the digital camera 100 according to this embodiment will be described with reference to FIG. 6.

If transmission is instructed using the operation member included in the operation unit 63, the transmission processing shown in the flowchart of FIG. 6 is started. The transmission instruction may be initiated after selecting one or more image files, or automatic transmission may be set at the time of shooting in advance and transmission of an image file may be initiated in response to generation of an image file. Here, the case where the image file having a format as of the image file 440 in FIG. 5D is recorded before transmission will be described as an example.

In step S601, system information is requested to the external device 101 through the communication unit 71A of the digital camera 100, and the external device 101 transmits the system information from the system controller 50B to the digital camera 100 through the communication unit 71B. As a result, the digital camera 100 acquires the system information of the transmission destination, and the process proceeds to step S602.

Next, in step S602, the inference model management information is requested to the external device 101 through the communication unit 71A of the digital camera 100, and the external device 101 transmits the inference model management information from the system controller 50B to the digital camera 100 through the communication unit 71B. As a result, the digital camera 100 acquires the inference model management information of the transmission destination, and the process proceeds to step S603.

In step S603, a transmission method is determined. Specific examples of transmission methods include wireless transmission such as Wi-Fi and BlueTooth (registered trademark), wired transmission using Ethernet cables and USB cables, and transmission using removable media such as SD cards. As for the method of determining the transmission method, if a plurality of transmission methods are available, the transmission method may be set by the user using the operation member included in the operation unit 63, or may be determined based on the connection state between the external device 101 and the digital camera 100. If only a single transmission method is available, that transmission method may be determined. After determining the transmission method, the process proceeds to step S604.

In step S604, the system information of the destination acquired in step S601 and the system information of itself are compared, and if they are the same, the process proceeds to step S605. If different, or if the system information of the transmission destination could not be acquired, the process proceeds to step S608.

In step S605, the management version of the inference model of the destination acquired in step S602 is compared with the management version of the inference model of the digital camera 100 itself held in the inference model recording unit 72A. If the management version of the transmission destination and its own management version match, the process proceeds to step S606, and if the management version of the transmission destination and its own management version do not match, or if the determination cannot be made for the reason that, for example, the management version of the transmission destination could not be acquired, the process proceeds to step S607.

In step S606, annotation information other than annotation information of the matching management version is deleted. For example, if the management versions match and the matching management version is not the latest management version, the annotation link information storage tag 402 and the annotation information 403*d* are deleted from the image file 440 shown in FIG. 5D to generate an image file 700 shown in FIG. 7A. By deleting annotation information other than that of the matching management version, reduction of data amount, improvement of data efficiency, and securing of expansion can be expected, since annotation information that is unlikely to be used is deleted while leaving the annotation information used in the destination system. After that, the process proceeds to step S610.

On the other hand, if the management versions do not match, in step S607, annotation information other than that of the latest management version is deleted. For example, the old annotation link information storage tag 408 and the old annotation information 409 are deleted from the image file 440 shown in FIG. 5D to generate an image file 710 shown in FIG. 7B. By deleting annotation information other than that of the latest management version, reduction of data amount, improvement of data efficiency, and securing of expansion can be expected, since annotation information that is unlikely to be used is deleted while leaving the annotation information used in the destination system. After that, the process proceeds to step S610.

Figure 7A:
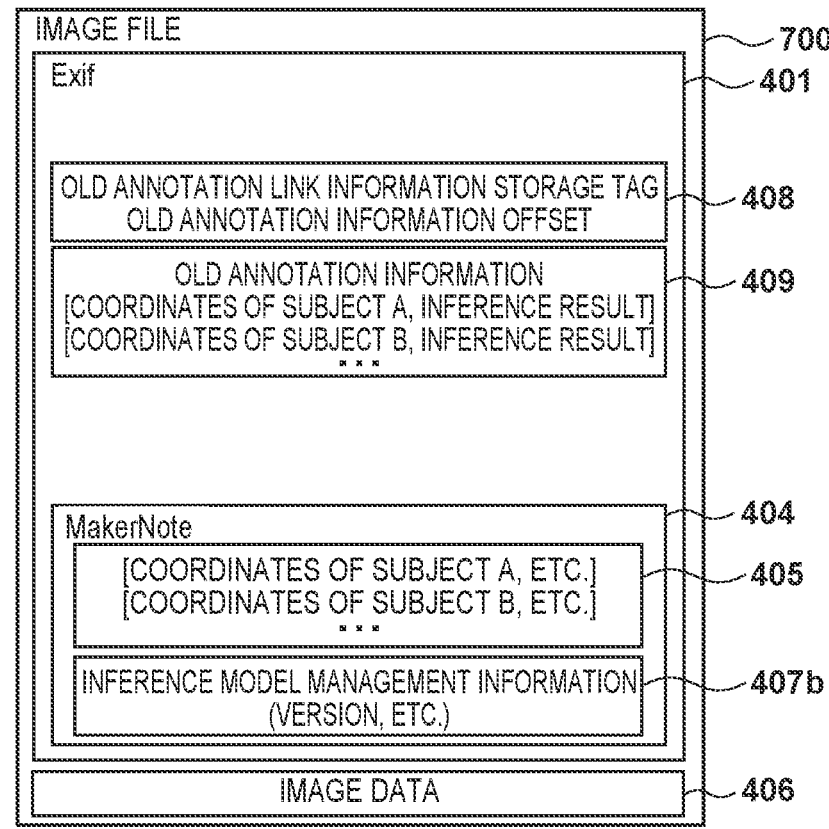
FIG. 7A is a diagram showing an outline of recorded contents of an image file during transmission processing of the digital camera according to the embodiment.
Figure 7B:
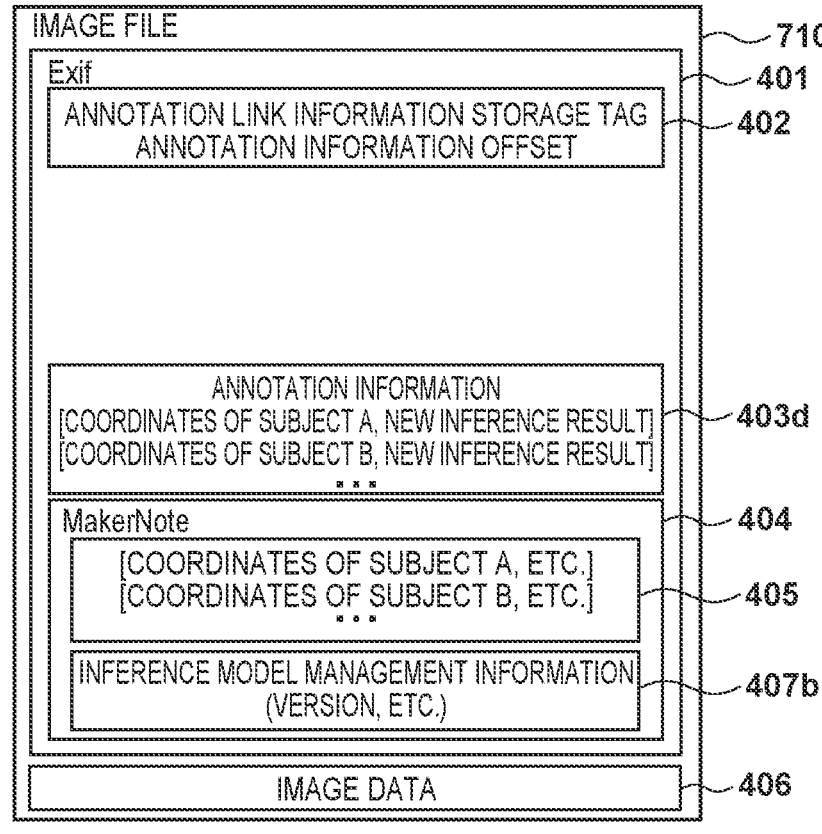
FIG. 7B is a diagram showing an outline of recorded contents of an image file during transmission processing of the digital camera according to the embodiment.

Further, if the system information does not match, in step S608, annotation information other than that of the latest management version is deleted in the same manner as in step S607. For example, an image file 710 as shown in FIG. 7B is generated from the image file 440 shown in FIG. 5D. By deleting annotation information other than that of the latest management version, reduction of data amount, improvement of data efficiency, and securing of expansion can be expected, since annotation information that is unlikely to be used is deleted. After that, the process proceeds to step S609.

Figure 7C:
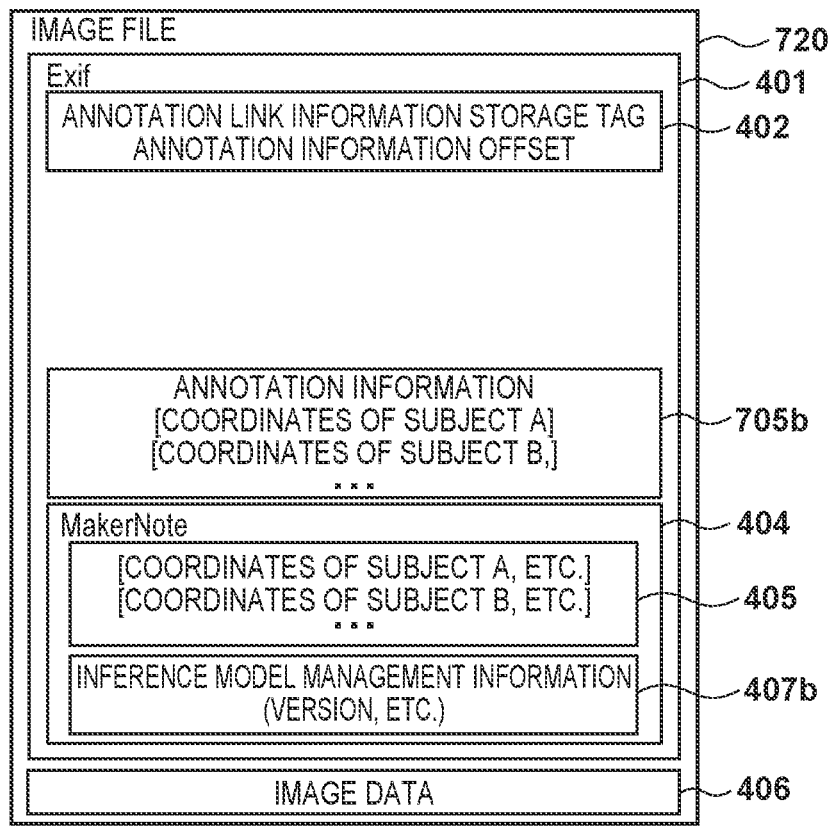
FIG. 7C is a diagram showing an outline of recorded contents of an image file during transmission processing of the digital camera according to the embodiment.

In step S609, the latest inference result is deleted. For example, the inference results included in the annotation information 705 are deleted from the image file 710 shown in FIG. 7B to generate an image file 720 as shown in FIG. 7C including annotation information 705b and the Maker-Note 404. By deleting the latest inference results, reduction of data amount, improvement of data efficiency, and securing of expansion can be expected by deleting inference result that is unlikely to be used. After that, the process proceeds to step S610.

In step S610, it is determined whether the reliability of the transmission method determined in step S603 is sufficiently high, and if it is determined that the reliability is sufficiently high, the process proceeds to step S612. If it is determined that the reliability of the transmission method is not sufficiently high, the process proceeds to step S611. Specifically, it may be determined that reliability is high when the transmission method is wired or use of the SD card, and reliability is low when the transmission method is wireless. Alternatively, even in the case of wireless communication, it may be determined that reliability is high in the case of an in-house LAN, and that reliability is low in the case of public wireless communication.

Figure 7D:
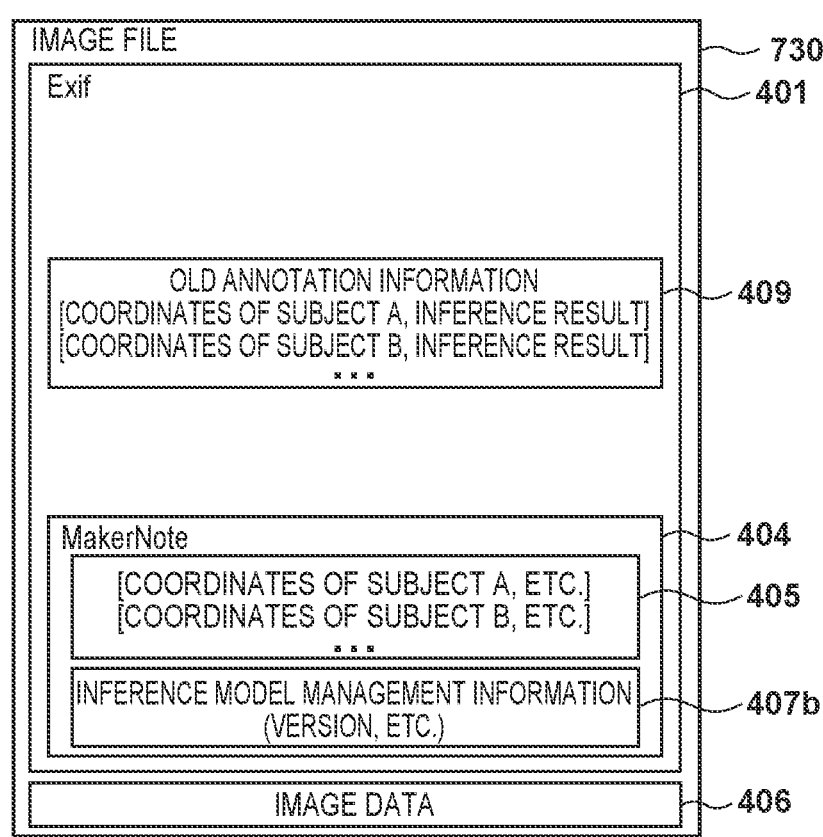
FIG. 7D is a diagram showing an outline of recorded contents of an image file during transmission processing of the digital camera according to the embodiment.

In step S611, the annotation link information storage tag is deleted. For example, if the image file 700 shown in FIG. 7A has been generated in step S606, the old annotation link information storage tag 408 is deleted and an image file 730 shown in FIG. 7D is generated. If the image file 710 shown in FIG. 7B has been generated in step S607, the annotation link information storage tag 402 is deleted and an image file 740 shown in FIG. 7E is generated. If the image file 720 shown in FIG. 7C has been generated in step S609, the annotation link information storage tag 402 is deleted and an image file 750 shown in FIG. 7F is generated.

In this way, by deleting the annotation link information storage tag, even if the image file is intercepted at the time of transmission, it is not possible to easily access the inference result, so leakage of know-how and assets (data created at a cost) can be prevented. After that, the process proceeds to step S612.

In step S612, the selected image file is transmitted using the transmission method determined in step S603, and the processing ends.

In the above explanation, the inference results are deleted for each image file, and then the transmission processing is performed, however, inference result deletion processing may be performed collectively for a plurality of image files, and then the plurality of image files subjected to the deletion processing may be collectively transmitted.

Next, editing processing of the digital camera 100 according to this embodiment will be described with reference to FIGS. 8A and 8B.

Figure 8A:
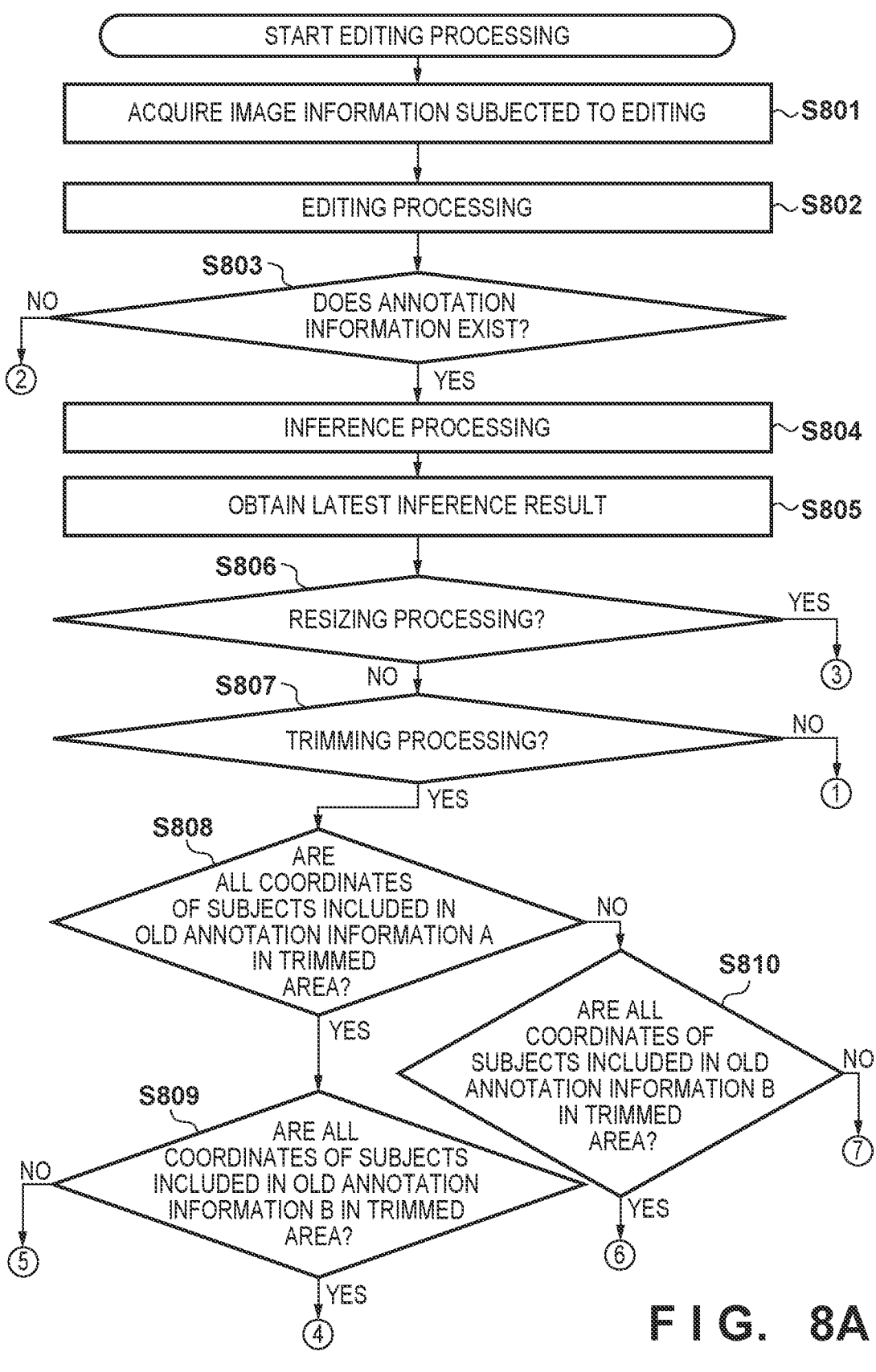
FIG. 8A is a flowchart showing editing processing in the digital camera according to the present embodiment.

When editing is instructed using the operation members included in the operation unit 63, the editing processing shown in the flowcharts of FIGS. 8A and 8B is started. The editing instruction may be given by selecting one or more image files and instructing editing content, or by instructing the editing content on a quick review image displayed on the display unit during shooting.

In step S801, the system controller 50A acquires image data, Exif data 401, etc. from image files stored in the external recording medium 91, issues a display request through the display unit 23, and the process proceeds to step S802.

In step S802, the acquired image data is edited according to the instructed editing content, and the edited image data is saved. For example, when an image file before editing is recorded in a format like the image file 440 in FIG. 5D described above, the acquired image data 406 is edited and the edited image data 912 is saved. If the MakerNote 404 of the image data 406 contains the information 405 on the detected subject, the information on the subject is converted according to the content of editing and recorded. For example, if the size of the image changes due to editing, the coordinates of each subject in the MakerNote 404 are converted according to the size of the edited image, converted coordinate information 911 is recorded, and an image file 910 shown in FIG. 9A is created.

Next, in step S803, the system controller 50A determines whether annotation information is stored in the image file of the image data to be edited acquired in step S801. If the annotation information is stored, the process proceeds to step S804, and if the annotation information is not stored, the process proceeds to step S820, the edited image file is recorded, and the editing processing is ended.

In step S804, inference processing using the inference engine 73A is performed on the image data edited in step S802. For example, if the image file 910 shown in FIG. 9A is input to the inference engine 73A, first, the subject area included in the image data 912 is specified from image data 912 and the annotation information 403d in the image file 910. Then, as a result of inference of each subject area using the inference engine 73A, the classification result of each subject included in the subject area is output. Note, the inference engine 73B of the external device 101 can also be used. Further, during inference, in addition to the inference results, there may be cases where information related to inference processing such as debug information on operations during inference and logs is output. After completing the inference processing, the process proceeds to step S805.

In step S805, if there is the management version of a current inference model held in the inference model recording unit 72A, debug information, or the like, the latest version is acquired from the inference model management information. Then, the acquired information is recorded in MakerNote, the inference result obtained in step S804 is recorded as annotation information, and the existing annotation information is recorded as old annotation information. For example, for the image file 910 shown in FIG. 9A, the inference result obtained in step S804 is recorded in annotation information 403*e* at the position indicated by the annotation information offset included in the annotation link information storage tag 402. On the other hand, the annotation information 403*d* already recorded in the image file 910 is recorded as old annotation information A 409*a* at the position indicated by old annotation information offset included in old annotation link information A storage tag 408. Further, the old annotation information 409 is recorded as old annotation information B 409*b* at the position indicated by old annotation information offset included in old annotation link information B storage tag 908. Furthermore, the management version of the current inference model and debug information are recorded as inference model management information 927 in the MakerNote 404. As a result an image file 920 shown in FIG. 9B is generated.

Next, in step S806, it is determined whether or not the editing processing was resizing processing for changing the size by enlarging or reducing the image data or the display contents on the screen. If it was the resizing processing, the process proceeds to step S814, and if it was not the resizing processing, the process proceeds to step S807.

In step S814, the metadata generation/analysis unit 70 is used to delete the annotation information obtained by the inference processing in step S804 of the image data of the image file generated in step S805, and retain the other annotation information. This is because, in the case of resizing processing, pixels after editing become coarser due to size conversion, and therefore the inference result of the original image is more accurate than that of the edited image. For example, in the case of the image file 920 shown in FIG. 9B, the annotation link information storage tag 402 and the annotation information 403*e* are deleted. On the other hand, the old annotation link information A storage tag 408, the old annotation link information B storage tag 908, the old annotation information A 409*a*, and the old annotation information B 409*b* are maintained. This generates an image file 930 as shown in FIG. 9C. After that, the process proceeds to step S817.

In step S807, it is determined whether or not the editing processing was trimming processing for adjusting the display range and size of the image by cutting off unnecessary portions around the image data. If it was the trimming processing, the process proceeds to step S808, and if it was not the trimming processing, the process proceeds to step S811.

In step S808, it is determined from the coordinate information of the subject indicated by the newer old annotation information among the old annotation information whether or not all the subject areas are in the area cut off by the trimming processing. If all the subject areas are in the trimmed area, the process proceeds to step S809; otherwise, the process proceeds to step S810.

In step S809, it is determined from the coordinate information of the subject indicated by the older old annotation information among the old annotation information whether or not all the subject areas are in the area cut off by the trimming processing. If all the subject areas are in the trimmed area, the process proceeds to step S815; otherwise, the process proceeds to step S816.

Figure 9D:
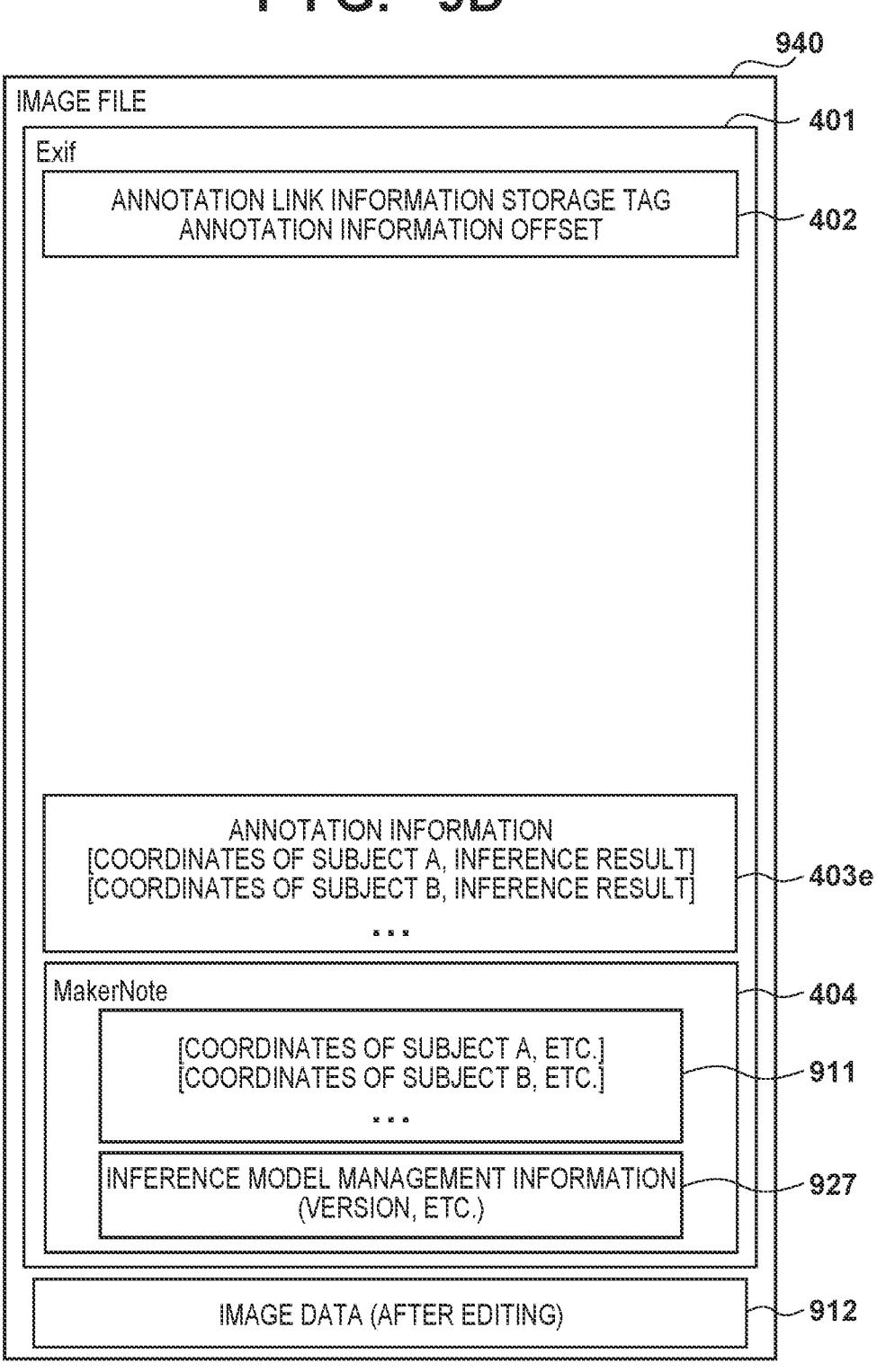
FIG. 9D is a diagram showing an outline of recorded contents of an image file during editing processing of the digital camera according to the present embodiment.

In step S815, the metadata generation/analysis unit 70 is used to delete all the old annotation information and retain the latest annotation information of the image data of the image file generated in step S805. This is because all the subject areas indicated by the old annotation information are trimmed area the trimming processing. For example, in the case of image file 920 shown in FIG. 9B, the old annotation link information A storage tag 408, the old annotation link information B storage tag 908, the old annotation information A 409*a*, and the old annotation information B 409*b* are deleted. As a result, an image file 940 as shown in FIG. 9D is generated. After that, the process proceeds to step S819.

In step S816, the metadata generation/analysis unit 70 is used to delete the newer old annotation information and retain the latest annotation information and the older old annotation information of the image data of the image file generated in step S805. This is because all the subject areas indicated by the newer old annotation information are trimmed by the trimming processing. For example, in the case of the image file 920 shown in FIG. 9B, the old annotation link information A storage tag 408 and the old annotation information A 409*a* are deleted. As a result, an image file 950 as shown in FIG. 9E is generated. After that, the process proceeds to step S819.

In step S810, it is determined from the coordinate information of the subject indicated by the older old annotation information of the image file whether or not all the subject areas are in the trimmed area by the trimming processing. If all the subject areas are in the trimmed area, the process proceeds to step S817; otherwise, the process proceeds to step S818.

In step S817, the metadata generation/analysis unit 70 is used to delete the older old annotation information and retain the latest annotation information and the newer old annotation information of the image data of the image file generated in step S805. This is because the subject areas indicated by the older old annotation information are trimmed by the trimming processing. For example, in the case of the image file 920 shown in FIG. 9B, the old annotation information B storage tag 908 and the old annotation information B 409*b* are deleted. As a result, an image file 960 as shown in FIG. 9F is generated. After that, the process proceeds to step S819.

In step S811, it is determined whether or not the editing processing was a moving image clipping processing of extracting a designated frame of a moving image of a format such as MPEG-4, converting it to JPEG format, and saving it. If it was the moving image clipping processing, the process advances to step S818, and if it was not the moving image clipping processing, the process advances to step S812.

In step S812, it is determined whether or not the editing processing was RAW development processing. In the RAW development processing, the image processing unit 20 performs compression process such as lossless compression on uncompressed RAW data, or applies image processes such as color conversion to image data that has undergone decompression processing, and converts it to JPEG format to create image data. If it was the RAW development processing, the process proceeds to step S813, and if it was not the RAW development processing, the process proceeds to step S818.

In step S813, it is determined whether or not the color tone of the image data was changed when the RAW development processing was performed in step S812. If the color tone of the image data was changed, the process advances to step S815 to perform the above-described processing. On the other hand, if the color tone of the image data was not changed, the process proceeds to step S818.

In step S818, all the image data of the image file generated in S805 are held. For example, if it is the image file 920 shown in FIG. 9B, the image file 920 is left unchanged. After that, the process proceeds to step S817.

In step S819, the image file generated in one of steps S814 to S818 is recorded in the external recording medium 91, and the editing processing ends.

In the above-described editing processing, annotation information is deleted after performing inference processing, however, in a case where the editing content is to delete the latest annotation information (resizing processing in the example shown in FIGS. 8A and 8B), the inference processing may not be performed.

Further, in the above example, the resizing processing, the trimming processing, the moving image clipping processing, and the ROW development processing have been described as examples of the editing processing, however, processing other than these may be used. Even in that case, as in steps S814 to S818, the necessary annotation information is retained and the unnecessary annotation information is deleted.

Further, the examples shown in FIGS. 9A to 9F show the case where there are two pieces of old annotation information, but the present invention is not limited to this. In that case, the processing of steps S808 to S810 may be changed according to the number of pieces of annotation information.

Furthermore, each data may be individually stored in the memory 25 not in a file format, and image files such as those shown in FIGS. 9C to 9F may be generated at the time of recording in step S817.

In addition, it has been explained that the image files are edited and then the inference processing is performed. However, the processing order may be changed so that the editing processing is performed collectively for a plurality of image files, and then the inference processing is collectively performed for the plurality of image files.

As described above, it is possible to manage annotation information while reducing the amount of data by deleting unnecessary annotation information while retaining necessary annotation information according to the editing content.

According to this invention, it is possible to manage the inference result of the subject in an image appropriately.

OTHER EMBODIMENTS

The present invention may be applied to a system composed of a plurality of devices, or an apparatus consisting of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising one or more processors and/or circuitry which function as:
   a detection unit that detects a subject from an image;
   an inference unit that performs inference processing using an inference model on the detected subject;
   a generation unit that generates an image file by combining image data of the image, information of the subject, an inference result of the inference processing, and information of the inference model;
   an operation unit that is used for correcting the inference result; and
   a learning unit that updates the inference model,
   wherein the generation unit records the inference model in a private area of the image file, and
   wherein, in a case where the inference result is corrected using the operation unit, the generation unit changes the inference result of the image file to corrected content, and the learning unit uses the corrected inference result to update the inference model.

2. The image processing apparatus according to claim 1, wherein the one or more processors and/or circuitry further function as a control unit that controls to display the inference result on a display unit in association with a corresponding subject,
   wherein the operation unit is used to correct the displayed inference result.

3. An image processing apparatus comprising one or more processors and/or circuitry which function as:
   a detection unit that detects a subject from an image;
   an inference unit that performs inference processing using an inference model on the detected subject; and
   a generation unit that generates an image file by combining image data of the image, information of the subject, an inference result of the inference processing, and information of the inference model,
   wherein the generation unit records the inference model in a private area of the image file, and
   wherein the inference unit is capable of further performing the inference processing on an image held in an image file, and, in a case where the image file holds information on the inference model, the inference unit determines whether the inference model of the image file is newer or older than the inference model of the inference unit, and performs the inference processing if the inference model of the inference unit is newer.

4. The image processing apparatus according to claim 3, wherein, if an output format of the inference result of the image file and an output format of the inference result by the inference unit are different, the inference result by the inference unit is added to the image file.

5. The image processing apparatus according to claim 3, wherein the inference model can be updatable from outside, and wherein, if the output format of the inference result of the image file and the output format of the inference result by the inference unit are the same, and if the inference model is updated from the outside, the inference result by the inference unit is added to the image file.

6. The image processing apparatus according to claim 5, wherein, if the output format of the inference result of the image file and the output format of the inference result by the inference unit are the same, and if the inference model is not updated from the outside, the inference result recorded in the image file is updated by the inference result by the inference unit.

7. An image processing apparatus comprising one or more processors and/or circuitry which function as:
    a detection unit that detects a subject from an image;
    an inference unit that performs inference processing using an inference model on the detected subject;
    a generation unit that generates an image file by combining image data of the image, information of the subject, an inference result of the inference processing, and information of the inference model;
    a communication unit that transmits the image file;
    an acquisition unit that acquires information about an inference unit of transmission destination of the image file; and
    a deletion unit that deletes at least a part of the inference result included in the image file according to the inference unit of the transmission destination,
    wherein the generation unit records the inference model in a private area of the image file, and
    wherein the communication unit transmits the image file from which at least a part of the inference result have been deleted by the deletion unit.

8. The image processing apparatus according to claim 7, wherein the deletion unit deletes the inference result obtained by the inference unit that does not match the inference unit of the transmission destination.

9. The image processing apparatus according to claim 7, wherein the generation unit further records link information to the inference result in the image file, and
    wherein in a case where reliability of the communication unit is lower than a predetermined reliability, the deletion unit deletes the link information.

10. The image processing apparatus according to claim 9, wherein the deletion unit deletes the link information when transmitting the image file via wireless communication.

11. An image processing apparatus comprising one or more processors and/or circuitry further which function as:
    a detection unit that detects a subject from an image;
    an inference unit that performs inference processing using an inference model on the detected subject;

a generation unit that generates an image file by combining image data of the image, information of the subject, an inference result of the inference processing, and information of the inference model; and
    an image processing unit that performs editing processing on an image held in the image file,
    wherein the generation unit records the inference model in a private area of the image file,
    wherein the inference unit performs the inference processing on an image having undergone the editing processing, and
    wherein the generation unit does not store in the image file after the editing processing at least a part of the inference result among the inference result of the image having undergone the editing processing and the inference result included in the image file according to content of the editing processing.

12. The image processing apparatus according to claim 11, wherein, in a case where the content of the editing processing is such that the inference result of the image having undergone the editing processing is not stored in the image file after the editing processing, the inference unit does not perform the inference processing on the image having undergone the editing processing.

13. The image processing apparatus according to claim 11, wherein, in a case where the editing processing is resizing processing, the generation unit does not store the inference result of the image having undergone the editing processing in the image file after the editing processing.

14. The image processing apparatus according to claim 11, wherein, in a case where the editing processing is trimming processing, the generation unit does not store the inference result of a subject in an area of the image to be trimmed by the trimming processing.

15. The image processing apparatus according to claim 11, wherein, in a case where the editing processing is moving image clipping processing, the generation unit retains in the image file after the editing processing the inference result of the image having undergone the editing processing and the inference result contained in the image file.

16. The image processing apparatus according to claim 11, wherein, if the editing processing is RAW development processing and if a color tone of the image does not change as a result of the development, the generation unit retains in the image file after the editing processing the inference result of the image having undergone the editing processing and the inference result included in the image file, and if the color tone changes, the generation unit does not retain in the image file after the editing processing the inference result of the image included in the image file.

* * * * *